(12) United States Patent
Totani et al.

(10) Patent No.: US 7,040,649 B2
(45) Date of Patent: May 9, 2006

(54) INTERIOR FINISH MEMBER FOR AN AUTOMOBILE WITH AN AIR BAG DEVICE

(75) Inventors: Chiharu Totani, Gifu (JP); Shigehiro Ueno, Aichi (JP); Hisao Hanabusa, Aichi (JP); Akiyoshi Nagano, Aichi (JP); Tetsuya Fujii, Aichi (JP); Katsuhiro Katagiri, Gifu (JP); Kenichi Furuta, Gifu (JP); Katsuhiro Okumura, Aichi (JP); Noriyuki Horiuchi, Aichi (JP); Muneharu Sasajima, Aichi (JP); Yukihiko Horiba, Aichi (JP)

(73) Assignee: Toyoda Gosei Co., Ltd., Aichi-Ken (JP)

( * ) Notice: Subject to any disclaimer, the term of this patent is extended or adjusted under 35 U.S.C. 154(b) by 332 days.

(21) Appl. No.: 10/423,909

(22) Filed: Apr. 28, 2003

(65) Prior Publication Data

US 2003/0209890 A1    Nov. 13, 2003

Related U.S. Application Data

(60) Division of application No. 09/612,253, filed on Jul. 7, 2000, now abandoned, which is a division of application No. 09/015,507, filed on Jan. 29, 1998, now Pat. No. 6,109,645, which is a continuation of application No. 08/663,842, filed on Jun. 14, 1996, now Pat. No. 5,865,461.

(30) Foreign Application Priority Data

| Jun. 16, 1995 | (JP) | ................................... 7-150661 |
| Jun. 16, 1995 | (JP) | ................................... 7-150665 |
| Dec. 12, 1995 | (JP) | ................................... 7-323295 |
| Dec. 13, 1995 | (JP) | ................................... 7-324572 |

(51) Int. Cl.
*B60R 21/16* (2006.01)

(52) U.S. Cl. ................................... 280/728.3; 280/732

(58) Field of Classification Search ............. 280/728.3, 280/728.2, 732, 730.1, 752
See application file for complete search history.

(56) References Cited

U.S. PATENT DOCUMENTS

| 4,508,676 A | 4/1985 | Sorensen .................... 264/255 |
| 4,990,077 A | 2/1991 | Morita ....................... 428/130 |
| 5,158,322 A * | 10/1992 | Sun ............................ 280/732 |

(Continued)

FOREIGN PATENT DOCUMENTS

EP    0586222    3/1994

(Continued)

*Primary Examiner*—Eric Culbreth
(74) *Attorney, Agent, or Firm*—Posz Law Group, PLC

(57) ABSTRACT

An interior finish member having a door for an air bag includes a main body and a cover. The main body surrounds the periphery of the cover, and the main body and the cover form a continuous surface. The cover covers a folded air bag. The cover includes: a door, which covers the folded air bag. A breakable portion is defined by a recessed periphery of the door and is relatively thin. A hinge connects the door with the main body and provides a pivot around which the door pivots under a force of an expanding air bag. The main body is made of thermoplastic resin, and the cover is made of thermoplastic elastomer. The main body and the cover portion can be integrally formed.

7 Claims, 18 Drawing Sheets

U.S. PATENT DOCUMENTS

| | | |
|---|---|---|
| 5,183,615 A | 2/1993 | Zushi |
| 5,303,951 A | 4/1994 | Goestenkors et al. .... 280/728.3 |
| 5,316,822 A | 5/1994 | Nishijima et al. .......... 428/138 |
| 5,394,602 A * | 3/1995 | Czapp et al. ................ 280/732 |
| 5,395,668 A | 3/1995 | Ito et al. ................... 280/728.3 |
| 5,447,327 A * | 9/1995 | Jarboe et al. ............ 280/728.3 |
| 5,458,361 A | 10/1995 | Gajewski ................ 280/728.3 |
| 5,478,107 A | 12/1995 | Yamagishi et al. ...... 280/728.3 |
| 5,482,313 A | 1/1996 | Ikeya et al. .............. 280/728.2 |
| 5,520,971 A | 5/1996 | Naritomi ................. 280/728.3 |
| 5,536,037 A | 7/1996 | Cherry ................... 280/728.3 |
| 5,588,669 A | 12/1996 | Leonard et al. .......... 280/728.3 |
| 5,615,908 A | 4/1997 | Phillion et al. .......... 280/728.3 |
| 5,618,485 A | 4/1997 | Gajewski |
| 5,650,115 A | 7/1997 | Proos et al. |
| 5,698,283 A | 12/1997 | Yamasaki et al. ........ 280/728.3 |
| 5,728,342 A | 3/1998 | Wirt et al. |
| 5,786,049 A | 7/1998 | Nusshor ................. 280/728.3 |
| 5,845,929 A | 12/1998 | Schlett et al. |
| 5,865,461 A | 2/1999 | Totani et al. ............. 280/728.3 |
| 5,887,891 A | 3/1999 | Taguchi et al. .......... 280/728.2 |
| 5,989,479 A | 11/1999 | Yamasaki et al. |
| 6,019,923 A | 2/2000 | Pelzer ........................ 264/132 |
| 6,042,139 A | 3/2000 | Knox |
| 6,129,378 A | 10/2000 | Goto et al. |
| 6,152,480 A | 11/2000 | Iwanaga ..................... 280/232 |
| 6,245,182 B1 | 6/2001 | Nakamura .................. 264/259 |
| 6,305,563 B1 | 10/2001 | Elliott ........................ 264/255 |

FOREIGN PATENT DOCUMENTS

| | | |
|---|---|---|
| FR | 2 703 011 | 9/1994 |
| GB | 2265338 | 9/1993 |
| GB | 2 277 908 | 11/1994 |
| JP | 4-274947 | 9/1992 |
| JP | 05 069451 | 3/1993 |
| JP | 5-162603 | 6/1993 |
| JP | 05 193434 | 8/1993 |
| JP | 5-229367 | 9/1993 |
| JP | 6-219231 | 8/1994 |

* cited by examiner

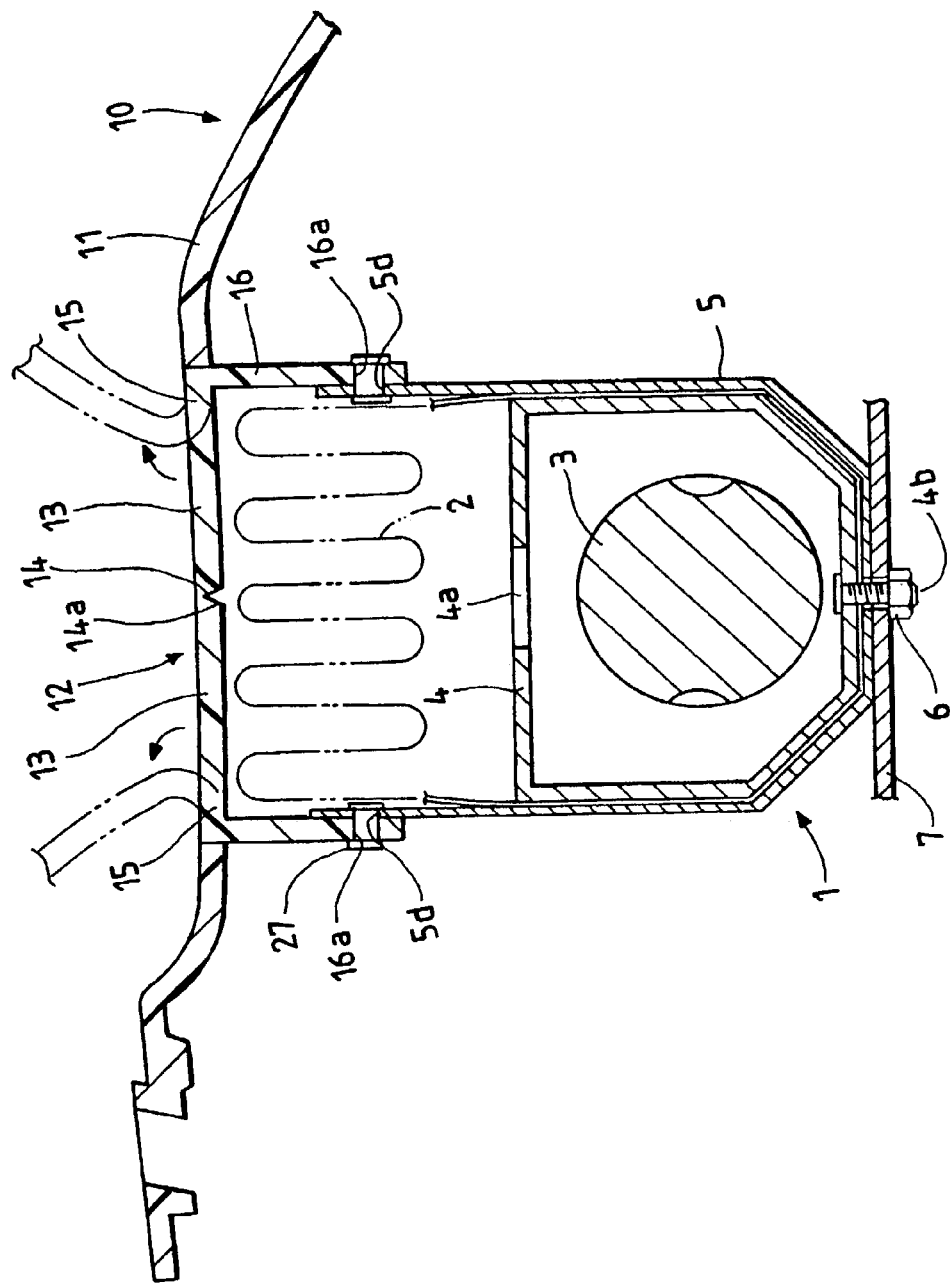

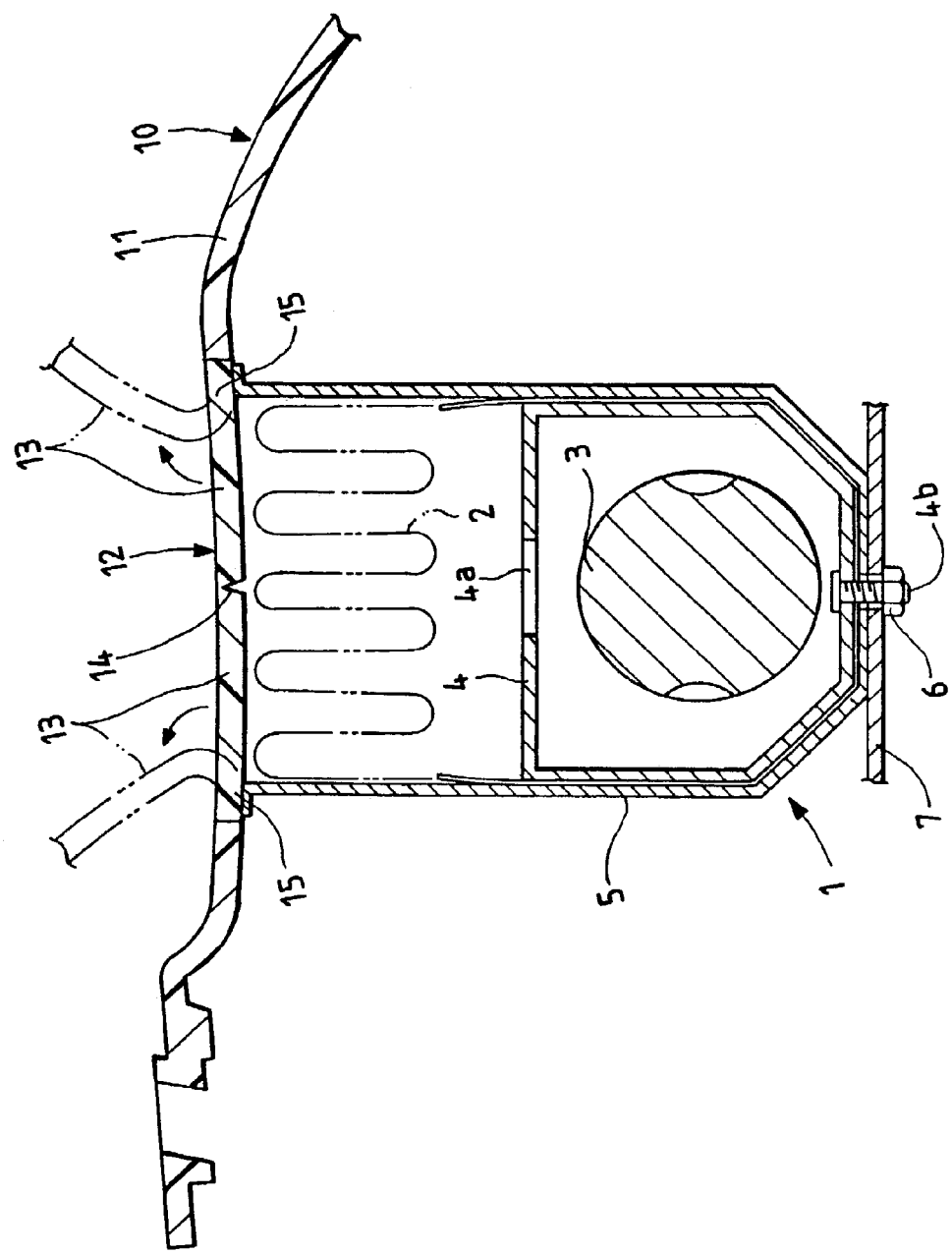

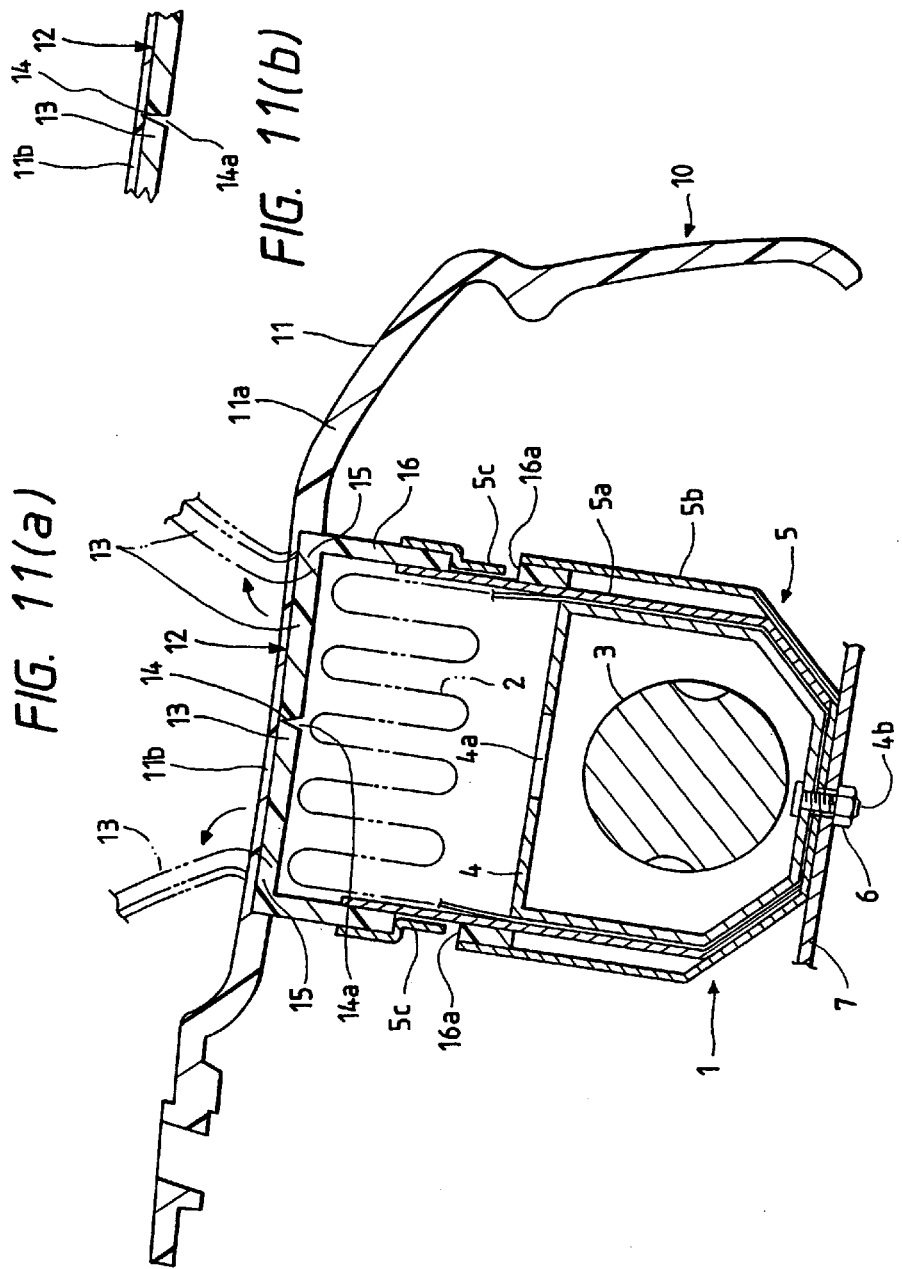

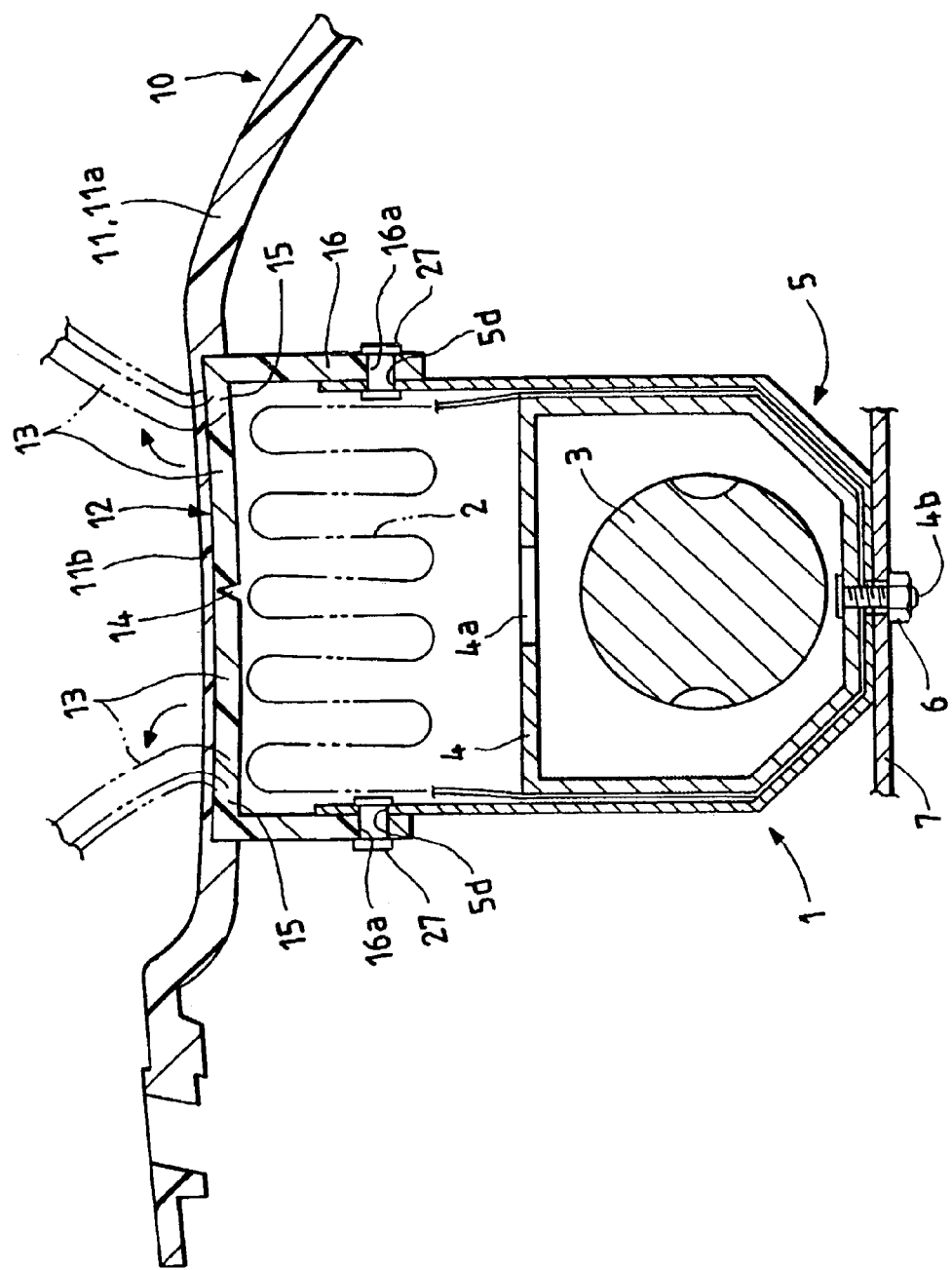

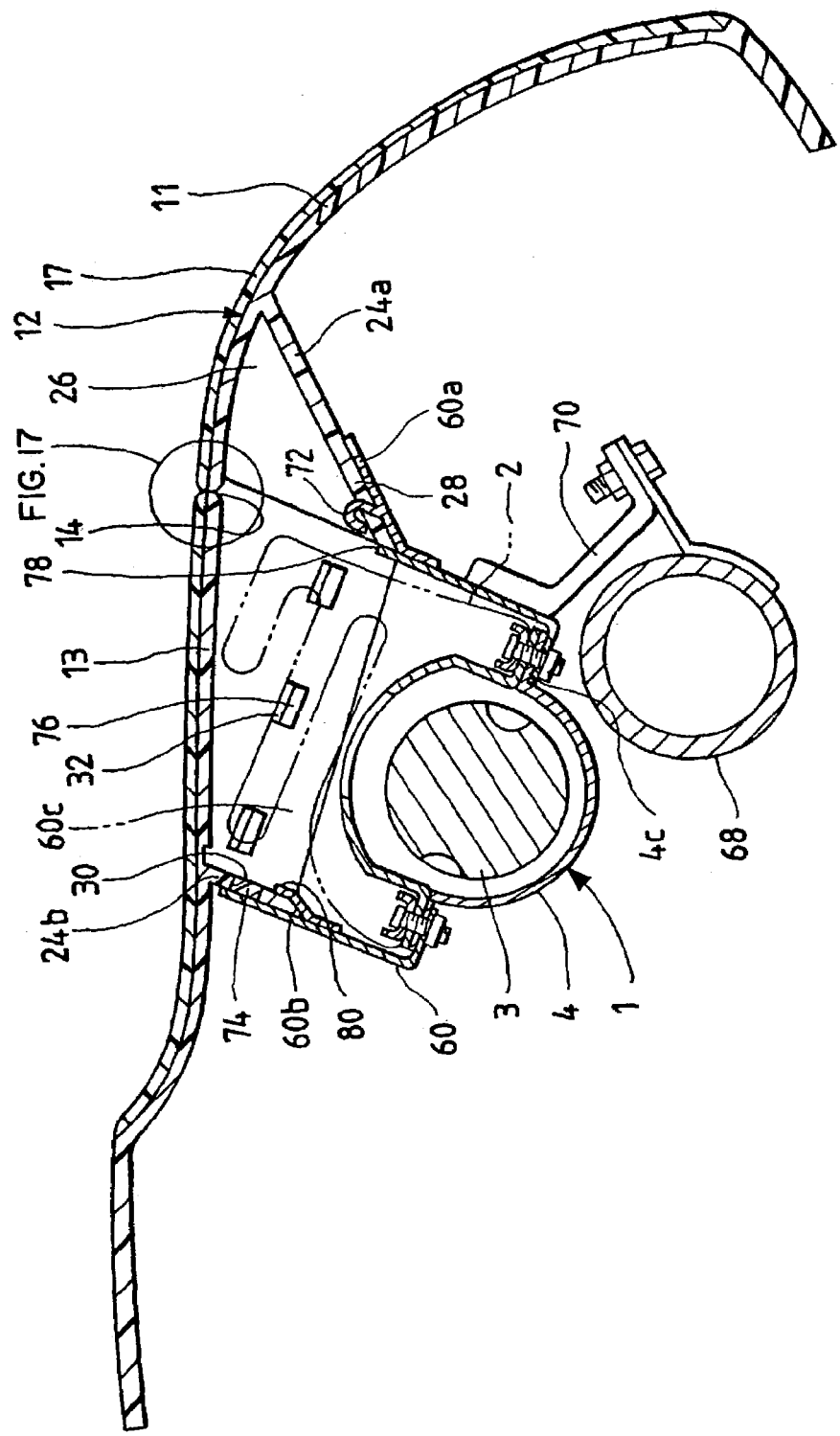

INTERIOR FINISH MEMBER FOR AN AUTOMOBILE WITH AN AIR BAG DEVICE

This application is a division of application Ser. No. 09/612,253 filed on Jul. 7, 2000, (Now Abandoned) which is a division of application Ser. No. 09/015,507 filed on Jan. 29, 1998,(Now U.S. Pat. No. 6,809,645) which is a continuation of application Ser. No. 08/663,842 filed on Jun. 14, 1996 (Now U.S. Pat. No. 5,865,461).

BACKGROUND OF THE INVENTION

1. Field of the Invention

The present invention relates to an automobile interior finish member having a door suitable for use with an air bag device. Examples of such an interior finish member are an instrument panel, a door trim and a seat back into which an air bag device is installed. More particularly, the present invention relates to a composition and a manufacturing method of the interior finish member wherein the interior finish member provides two necessary yet incompatible properties of rigidity and flexibility.

2. Description of the Related Art

A conventional instrument panel of this type of interior finish member comprises a main body portion and a cover portion for an air bag, as disclosed by Japanese Patent Publication No. Hei. 5-162603. The main body portion of the instrument panel and the cover portion are made of rigid thermoplastic resin. The main body portion of the instrument panel and the cover portion are integrally formed in such a manner that surfaces of the main body portion and the cover portion form a continuous surface. The cover portion includes: a door portion which deploys under a force of an expanding air bag, providing an opening through which the expanding air bag can pass; a hinge portion constructed and arranged to provide a pivot around which the door portion can open; and a breakable portion, defined by a notched periphery of the cover portion wherein the wall thickness of the periphery is thinner than adjacent portions of the instrument panel.

An instrument panel must be both rigid and flexible. The main body portion of the instrument panel must be weather and heat resistant as well as rigid enough to resist impact and preserve its design shape. On the other hand, the cover portion of the instrument panel is required to have a breakable portion which does not fragment in its breaking process. Accordingly, a hinge portion of the cover portion, which functions as a fulcrum during deployment of the door portion, must be flexible yet have sufficient tensile strength to resist separating from the main body (hereinafter the "deployment property").

However, since rigidity is incompatible with flexibility, it is difficult to select a material satisfying both properties. As a result, the wall thickness of the hinge portion and the wall thickness of the breakable portion around a periphery of the door portion must be carefully controlled to accommodate the two requisite properties.

To provide the rigidity necessary to resist impact and preserve the design shape, both the main body and the cover portion of the conventional instrument panel are made of fiber reinforced thermoplastic resin (FRTP) which provides the necessary rigidity and impact resistance. Such fiber reinforced thermoplastic resin provides stiffness in the portion to be severed. To provide the flexibility necessary in the hinge portion, the wall thickness in the hinge portion is reduced. However, when the wall thickness is reduced, it becomes difficult to provide the necessary tensile strength of the hinge portion.

Therefore, providing the requisite rigidity, flexibility and tensile strength of the hinge portion becomes a formidable task. In the conventional interior finish member, the difficulties in selecting a material and carefully controlling the wall thickness is handled by reducing the wall thickness of the hinge portion and disposing a strong but flexible reinforcing member, such as a net made of aramid fiber, in the hinge portion.

However, when such a reinforcing member is used during the manufacturing of the conventional instrument panel, it is necessary for a worker to manually set the flexible reinforcing member at a predetermined position in the mold. This process expends time and labor costs.

To illustrate the problem associated with this type of conventional interior finish member, an instrument panel 310 having a substantially curved section is shown in FIG. 22. The instrument panel 310 comprises: a main body 311; a cover portion 312; and a square tube-shaped attaching wall (shown partially by a front attaching wall 324a and a rear attaching wall 324b) disposed on a back side of the cover portion 312 and connected to an air bag device. In this connection, a facing layer 117 manufactured by means of insertion formation is provided for the purpose of enhancing the design.

Manufacture of the instrument panel 310 is conducted by a stationary mold 340 and a movable mold 338 moved in a direction perpendicular to the maximum expanding portion on a curved surface (shown in the direction of the arrow in FIG. 22). This process prevents the occurrence of an undercut in both the stationary mold 340 and the movable mold 338. However, the front attaching wall 324a and the rear attaching wall 324b, which are formed substantially perpendicular to an upper surface of the instrument panel 310, cross a mold releasing direction, so that the undercut is formed.

Moreover, a first sliding core 126 and a second sliding core 128 are necessary in the mold releasing directions of the front attaching wall 324a and the rear attaching wall 324b. As a result, the structure of the metallic mold becomes complicated.

SUMMARY OF THE INVENTION

To solve the aforementioned problems, an object of the present invention is to provide an interior finish member having a door suitable for an air bag device having the necessary rigidity and flexibility. Further, the present invention provides an easy manufacturing method of the interior finish member.

Another object of the present invention is to provide an interior finish member which can be manufactured using a simple metallic mold structure and a manufacturing method thereof.

According to a first aspect of the invention, an interior finish member under which an air bag device is installed, comprises two major parts: a main body made of thermoplastic resin; and a cover portion made of thermoplastic elastomer capable of thermally fusing with the thermoplastic resin of the main body. The cover portion covers a folded air bag of the air bag device, and its periphery is surrounded by the main body. The cover portion may comprise a breakable portion defined along the periphery of the cover portion where the thickness of the periphery is thinner than adjacent portions of the interior finish member.

The surfaces of the main body and the cover portion form a continuous surface, and the interior finish member may further comprise a facing layer or facing member disposed continuously on the surfaces of the main body and the cover portion. A recess may be formed on a back side (in other words, the back side is the side opposite the surface visible to a passenger) of the facing layer or facing member, wherein the recess of the facing layer aligns with the breakable portion.

Further, the interior finish member may comprise a bracket projecting from the peripheral edge of the cover portion constructed and arranged to be connected to the air bag device.

Alternatively, the interior finish member may comprise a square tube-shaped attaching wall projecting from the cover portion and connecting to the air bag device. The square tube-shaped attaching wall has a front attaching wall and a rear attaching wall, where the rear attaching wall is formed in the same direction as the mold releasing direction of the interior finish member which crosses the direction of deployment of the air bag.

A plurality of ribs may be formed in parallel with the mold releasing direction between the rear attaching wall and the back side of the cover portion. The front edges of the ribs may be parallel with the front attaching wall, and the upper front ends of the ribs may be adjacent to the breakable portion.

According to the second aspect of the invention, a method of manufacturing the interior finish member comprises the steps of: injecting hard thermoplastic resin into a mold to form the main body; injecting thermoplastic elastomer capable of thermally fusing with the thermoplastic resin into the mold to form the cover portion; removing the interior finish member from the mold; and notching the interior finish member along the periphery of the cover portion to form a breakable portion of the interior finish member.

The method of manufacturing an interior finish member may further comprise an additional step of disposing a facing layer in the mold.

In view of the foregoing, since the main body of the interior finish member is made of thermoplastic resin, it is easy to ensure rigidity. Also, since the cover portion is made of thermoplastic elastomer, the elasticity of the cover portion is higher than that of the main body. Therefore, it is easy to provide the necessary deployment property of the hinge portion. The breakable portion provided in the cover portion is formed in such a manner that the back side of the cover is recessed so that the wall thickness of the breakable portion can be reduced, enabling the recessed portion to be broken without difficulty.

When manufacturing the interior finish member, it is possible to use a two-differential-property forming method in which the cover portion is formed after the formation of the main body. Accordingly, compared with a conventional manufacturing method in which the flexible reinforcing member is set at a predetermined position, the manufacturing work can be easily automated. Hence, it not necessary to manually set the reinforcing member at the predetermined position.

Therefore, the interior finish member of an air bag device of the present invention can be manufactured easily while ensuring the necessary rigidity and desired easy deployment of the door portion when the air bag expands.

The present invention also makes it possible to manufacture the interior finish member while the surface of the cover portion is set on the same surface as that of the main body. Further, the material of the cover portion is capable of thermally fusing with the material of the main body. Hence, there is no visible boundary line between the main body and the cover portion providing a superior appearance, particularly, when a facing layer is provided on the surfaces of the main body and the cover portion.

If a facing layer is used, a recess is formed on the back side of the facing layer aligned with the breakable portion. When the air bag deploys, stress concentration form in the recess allowing the breakable portion and the facing layer to be broken smoothly. Accordingly, the deployment property of the door portion can be improved.

Further, when a bracket, projecting from an outer peripheral edge of the cover portion toward the air bag device, is provided for connection with the air bag device, the door portion and the air bag can be positioned with respect to each other quite easily.

Furthermore, when a square tube-shaped attaching wall provided with the air bag device is formed on the back side of the cover portion, it is not necessary to dispose a sliding core which is conventionally provided in a mold releasing direction of the rear attaching wall. However, with the present invention, since the rear attaching wall of the square tube-shaped attaching wall is arranged in the same direction as the mold releasing direction of the main body of the interior finish member, a sliding core is not needed. Therefore, the metallic mold structure can be simplified.

Since the rear attaching wall is reinforced by the reinforcing ribs, the mechanical strength of the attaching wall is not a problem. When the rear end portions of the reinforcing ribs are disposed in parallel with the front attaching wall, there is no possibility of the air bag entering a space formed between the rear attaching wall and the back side of the cover portion during deployment of the air bag. Accordingly, the air bag expands out stably.

Moreover, when upper front end portions of the reinforcing ribs are arranged adjacent to a breakable portion of the cover portion, stress is positively concentrated on the breakable portion when the air bag is expanded. This arrangement increases stability in the deployment property. In addition, enabling the interior finish member to be formed by a simple metallic mold structure enhances the productivity in the manufacturing of interior finish members.

Regarding the operation and effects of the manufacturing method, since the cover portion and the main body are made of different kinds of materials, it is possible to select an appropriate thermoplastic resin for the cover portion and the main body so that the incompatible characteristics (flexibility and bending stiffness) required for each part can be satisfied easily.

As for the cover portion, it is possible to select a soft material by which the hinge characteristic (deployment property of the door) is not deteriorated, even if the wall thickness is increased to provide the tensile strength required for the hinge portion when the door is opened.

The breakable portion, whose thickness is thinner than adjacent portions of the instrument panel, may be formed when the interior finish member is molded by a metallic mold as well. In this process, a surface forming sheet having a barrier layer, which has a relatively high strength, is set in a metallic mold, and the breakable portion is notched from the back side of the cover portion onto the barrier layer.

All these steps can be carried out without having a worker manually setting a flexible reinforcing strap one by one only at a predetermined position (hinge portion) in the metallic mold.

In the manufacturing process, the cover portion and the main body portion are sequentially formed in the fixed cavities in the metallic mold. Along with the sequential formation, the cover portion and the main body portion are thermally fused together and integrated with each other. Since the formed cavity is divided into the first and the second cavity, it is not necessary to provide a sliding core. Therefore, this forming method of the present invention is much simpler than the forming method required for the conventional interior finish member.

BRIEF DESCRIPTION OF THE DRAWINGS

FIG. 5 is a cross-sectional view showing a second embodiment of the present invention;

FIG. 10 is a cross-sectional view showing a fifth embodiment of the present invention;

FIG. 11(a) is a cross-sectional view showing a sixth embodiment of the present invention;

FIG. 11(b) is a partial cross-sectional view showing a modification of the embodiment shown in FIG. 11(a);

FIG. 13 is a cross-sectional view showing a seventh embodiment of the present invention;

FIG. 16 is a cross-sectional view taken along line 16—16 of FIG. 15;

DETAILED DESCRIPTION OF THE PREFERRED EMBODIMENTS

1st Embodiment

Figure 1:
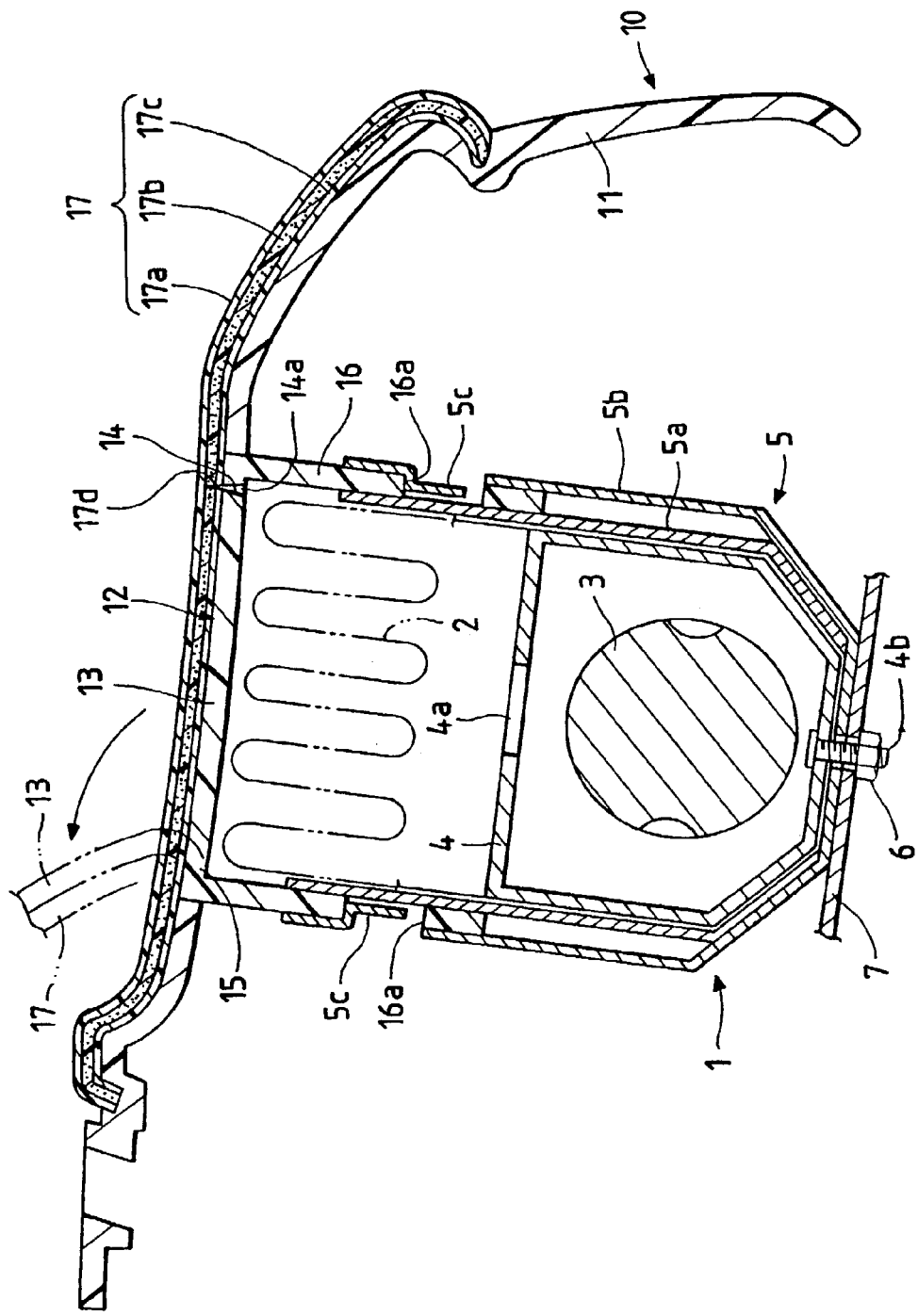
FIG. 1 is a cross-sectional view showing a first embodiment of the present invention.
Figure 2:
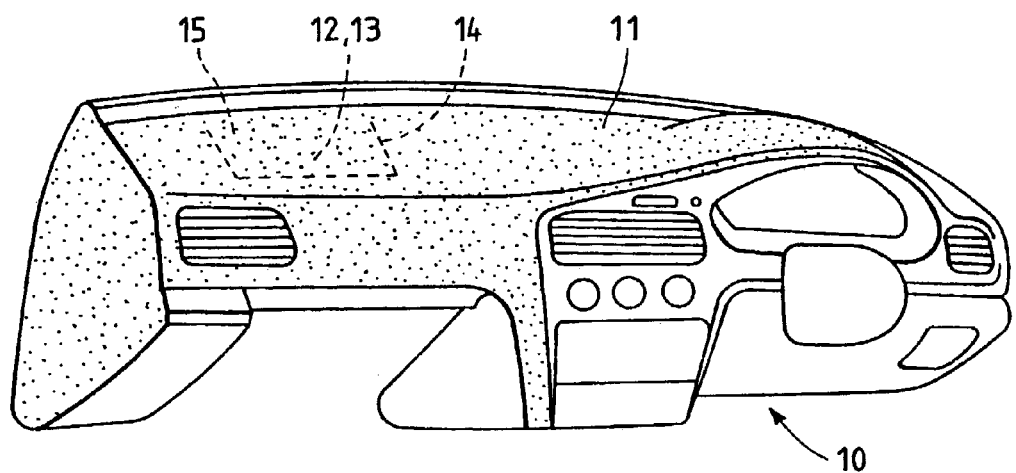
FIG. 2 is a perspective view of the first embodiment.
Figure 3:
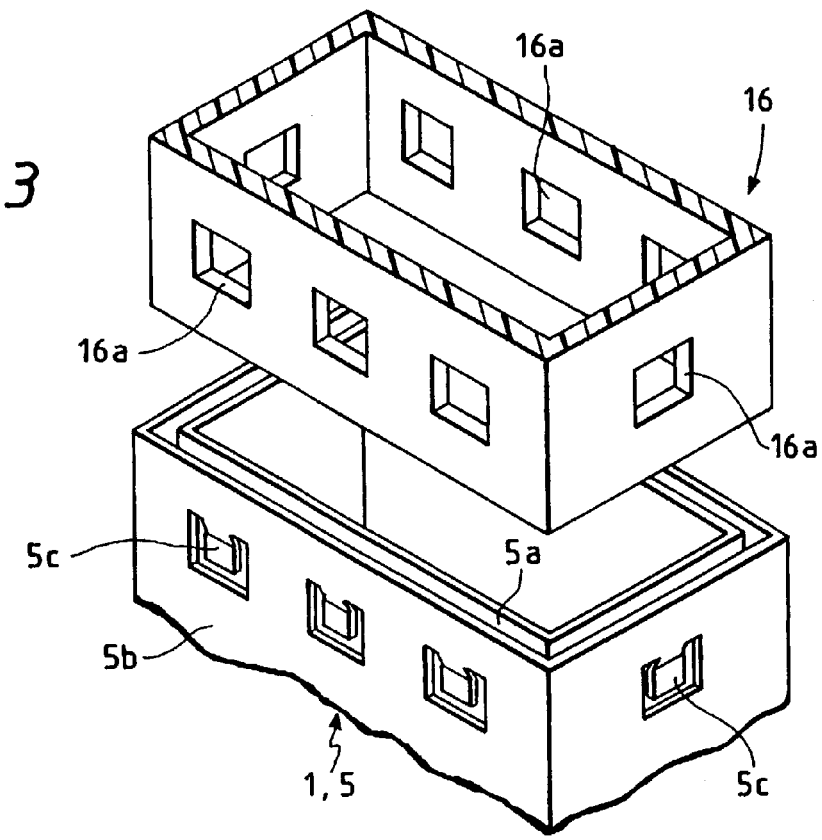
FIG. 3 is a perspective view showing an arrangement of connection of the device of the first embodiment with the air bag device.

An interior finish member of a first embodiment is an instrument panel 10 shown in FIGS. 1 to 3. The instrument panel 10 includes: a main body 11; and a cover portion 12 surrounded by the main body 11. The cover portion 12 covers a folded air bag 2 of an air bag device 1, and surfaces of the main body 11 and the cover portion 12 form a continuous surface.

The air bag device 1 includes: an air bag 2 which is accommodated in the air bag device 1 in a folded position; an inflator 3 which supplies gas to the air bag 2 when it expands; a tubular diffuser 4 which diffuses gas sent from the inflator 3 so that the gas can flow into the air bag 2; and a box-shaped case 5 which houses the air bag 2, inflator 3 and diffuser 4.

The gas sent from the inflator 3 is diffused through a gas communicating port 4a and flows into the air bag 2. A plurality of bolts 4b protrude from the diffuser 4. Fixing these bolts 4b with nuts 6 integrates the case 5, air bag 2 and diffuser 4 into one body. The air bag device 1 is fixed to a bracket 7 protruding from a frame of the vehicle.

A side wall portion of the case 5 has a double structure composed of an inner panel 5a and an outer panel 5b. A predetermined number of claws 5c on the outer panel 5b are raised and extended in a direction of the inner panel 5a. These claws 5c are engaged with a bracket 16 as described later.

The cover portion 12 includes: a door portion 13 for covering the folded air bag 2; a breakable portion 14, defined by a recessed periphery of the door portion 13 on the back side; and a hinge portion 15 for connecting the door portion 13 with the main body 11 when the breakable portion 14 breaks allowing the door portion 13 to pivot around the hinge portion 15.

In the first embodiment, the breakable portion 14 forms a U-shape, and the hinge portion 15 is disposed between the two upper end portions of the U-shape. The recess 14a, which defines the breakable portion 14, may be formed either continuously or intermittently.

From the outer peripheral edge of the cover portion 12, a square tube type bracket 16 extends from the instrument panel 10 toward the air bag device. The bracket 16 has attaching holes 16a which engage with claws 5c of the outer panel 5b. The air bag device 1 is attached to the instrument panel 10 by insertion of the claws 5c of the air bag case 5 into the attaching holes 16a.

Preferably, the main body 11 of the instrument panel 10 is made of polypropylene (PPF) containing filler such as rigid thermoplastic resin, and the cover portion 12 including the bracket portion 16 is made of thermoplastic elastomer, preferably olefin thermoplastic elastomer (TPO) which is capable of thermally fusing with PPF. The cover portion 12 may also be made of styrene thermoplastic elastomer (SBC) capable of thermally fusing with PPF. Examples of suitable styrene thermoplastic elastomers (SBC) include: styrene/ethylene/butylene block copolymer (SEBS), styrene/isoprene block copolymer (SIS), styrene/butadiene block copolymer (SBS) and styrene/ethylene/propylene block copolymer (SEPS).

The bending elastic modulus of a material used for the main body 11 preferably should not be less than 2000 MPa so as to ensure rigidity.

The mechanical property of the cover portion 12 is such that when the breakable portion 14 is broken by a force of an expanding air bag, the breakable portion 14 does not fragment. Further, it is necessary that the breakable portion 14 breaks easily. The hinge portion 15 must have the deployment property by which the door portion can be easily opened. Accordingly, the hinge portion 15 is made of a material whose tensile rupture stress is preferably between 5 to 30 MPa.

To enhance external appearance, the instrument panel 10 includes a facing member 17 disposed over and thermally fused to the surfaces of the main body 11 and the cover portion 12. This facing member 17 includes: a skin layer 17a disposed as an outermost layer, made of soft vinyl chloride providing a soft feel; a foaming layer 17b made of foaming polypropylene disposed under the skin layer 17a; and a barrier layer 17c made of polypropylene, olefin thermoplastic elastomer or styrene thermoplastic elastomer disposed under the foaming layer 17b. The barrier layer 17c is provided for the purpose of protecting the foaming layer 17b from the pressure and heat during the process of mold injection of the main body 11 and the cover portion 12 The barrier layer 17c is thermally fused to the main body 11 and the cover portion 12.

The facing member 17 is previously formed into a sheet-shape structure in three layers. The thickness of the facing member 17 is preferably between 0.8 to 6.2 mm; the thickness of the skin layer 17a is preferably between 0.4 to 0.7 mm, the thickness of the foaming layer 17b is preferably between 0 to 4.0 mm, and the thickness of the barrier layer 17c is preferably between 0.4 to 1.5 mm. The thickness of the main body 11 adjacent to the cover portion 12 is preferably 3.5 mm, and the thickness of the door portion 13 and the thickness of the hinge portion 15 of the cover portion 12 are both preferably 3.5 mm.

Figure 4A:
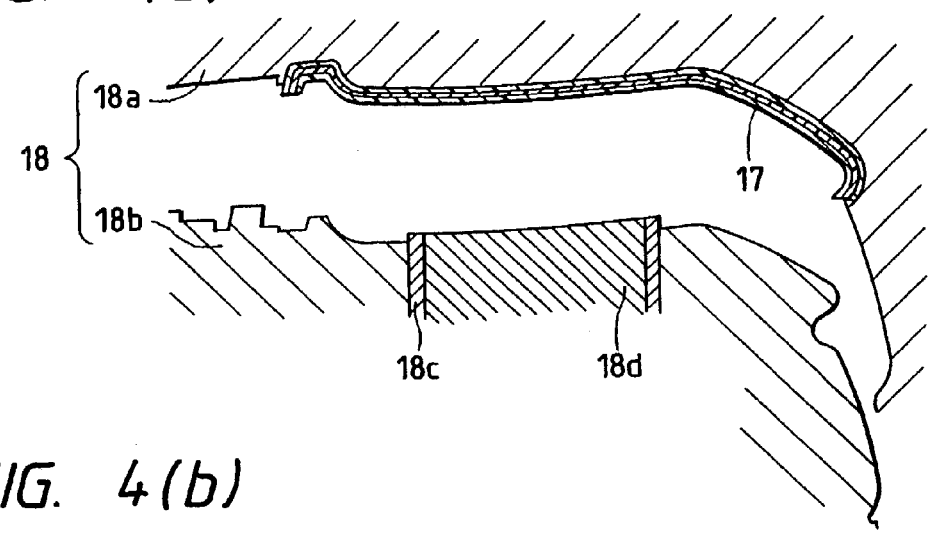
FIGS. 4(a) to 4(c) are cross-sectional views showing a forming process of the device of the first embodiment.
Figure 4B:
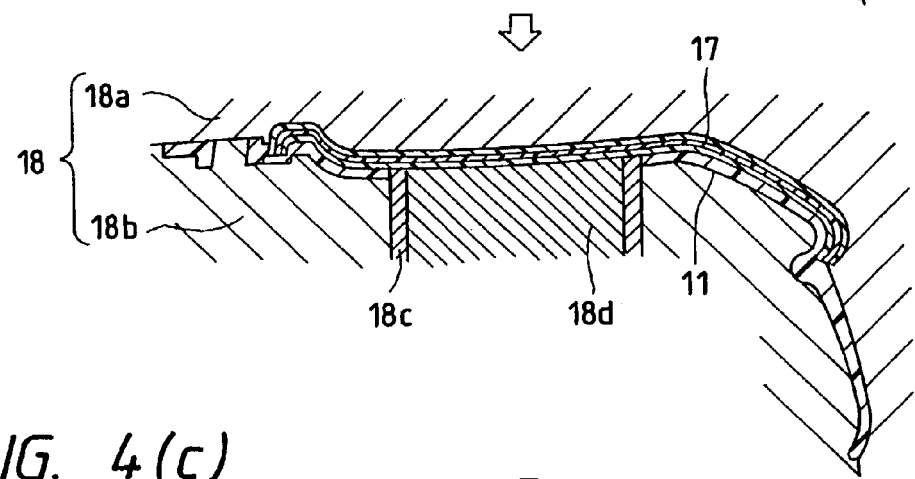
Figure 4C:
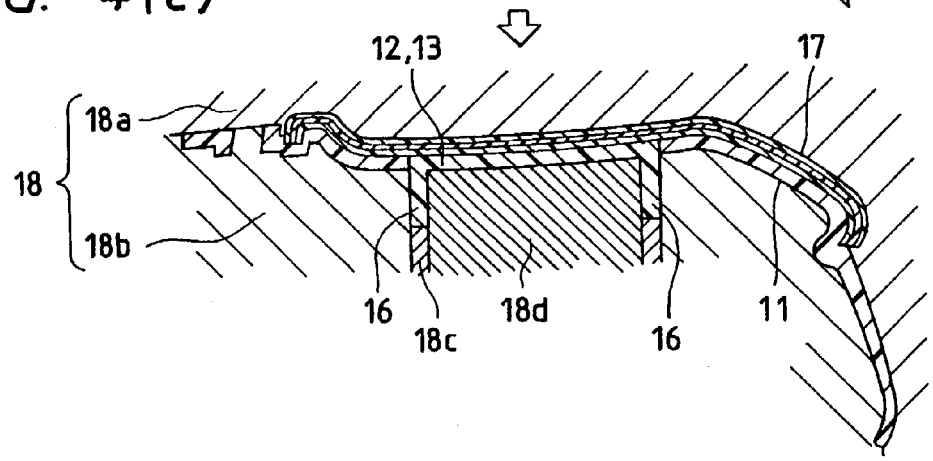

The instrument panel 10 of the first embodiment is manufactured as follows. As shown in FIGS. 4(a) to 4(c), the facing member 17, which has already been formed into a predetermined shape by means of vacuum forming, is set in a split mold 18a of the forming mold 18 as shown in FIG. 4(a). The mold then is fastened. Once the mold is fastened, the main body 11 of the instrument panel 10 is formed by means of injection molding as shown in FIG. 4(b). For this injection molding, the mold 18 has a two-stage sliding core which forms the main body 11 and the cover portion 12.

This forming mold 18 comprises split molds 18a and 18b. The split mold 18b includes: a square tube type sliding core 18c capable of manufacturing the cover portion 12 and a square pillar type sliding core 18d. In the process of forming the main body 11, the sliding cores 18c, 18d are pressed against the facing member 17. After the main body 11 of the instrument panel has been formed, the sliding core 18c is lowered to its initial position, while the sliding core 18d is lowered just slightly. Under this condition, the cover portion 12 is formed by injection molding as shown in FIG. 4(c).

Thus far in the manufacturing process, the recess 14a of the breakable portion 14 and the attaching holes 16a are not yet formed. Rather, the recess 14a of the breakable portion 14 and the attaching holes 16a are formed using an ultrasonic welder following solidification of the cover portion 12. A recess 17d of the facing member 17 may be formed either continuously or intermittently on the facing member 17 at a position aligning with the breakable portion 14.

After the manufactured instrument panel 10 has been mounted on a vehicle, the air bag device 1 is connected to the instrument panel 10 in the following manner. The bracket 16 is inserted into a cavity between the inner panel 5a and the outer panel 5b of the case 5 of the air bag device 1. The air bag device 1 and the case 5 are integrally joined by a bolt 4b. Claws 5c are inserted into and engaged with attaching holes 16a, thereby connecting the air bag device 1 and the instrument panel 10. The bracket 7 is fixed to the bolt 4b by a nut 6, and the other end portion of the bracket 7 is fixed to a frame not shown. In this way, the air bag device 1 is attached to the instrument panel 10. When the instrument panel 10 is mounted on a vehicle, predetermined functional meters are attached onto the instrument panel 10.

In the operation of the air bag device 1, gas is discharged from the inflator 3. Then the discharged gas flows into the air bag 2 through the gas communicating hole 4a of the diffuser 4. At this time, the expansion of the air bag 2 breaks both the breakable portion 14 and the recess 17d of the facing member 17. Therefore, the door portion 13 is opened around the hinge portion 15, so that the air bag 2 can be expanded through an opening created by deployment of the door portion 13. Since the cover portion 12 is made of a material capable of thermally fusing with the material of the main body 11, the cover portion 12 strongly adheres to the main body 11. Hence, the cover portion 12 will not be peeled away from the main body 11 by the operation of the air bag.

As described above, the main body 11 of the instrument panel 10 of the first embodiment is made of rigid thermoplastic resin. Therefore, it is easy to ensure the rigidity of the main body 11. The cover portion 12 is made of thermoplastic elastomer. Thus, the cover portion 12 is more elastic than the main body 11, so the deployment property of the hinge portion 15 can be easily ensured. The breakable portion 14 of the cover portion 12 is recessed which reduces the thickness of the breakable portion 14. Therefore, the breakable portion 14 can be broken easily.

When manufacturing the instrument panel 10, it is possible to adopt a two-differential-property forming method in which the cover portion 12 is formed after the main body 11 has been formed. Accordingly, it is not necessary to manually set a reinforcing member at the predetermined position in the process of forming the cover portion 12, as was necessary in the conventional manufacturing method. The present invention makes such manual labor unnecessary since the main body 11 of this embodiment is made of a rigid material. Therefore, it is possible to automate the formation of the instrument panel 10 using the forming mold 18 having a two-stage sliding core.

The following method may also be adopted to manufacture the instrument panel 10 without using the forming mold 18. After the main body 11 has been formed, the main body 11 is set in a mold by which the cover portion 12 is formed. Then the insertion formation is conducted to manufacture other aspects of the instrument panel 10. Even in this case, since the main body 11 is rigid, it is easy to hold and move the main body 11 with a robot or the like. Consequently, the present invention provides an ease with which the instrument panel 10 of the first embodiment can be manufactured while ensuring the necessary rigidity of the main body 11 and the desired deployment property of the cover portion 12.

According to the first embodiment, the design of the external appearance can be enhanced since a continuous facing layer is disposed over the surfaces of the main body 11 and the cover portion 12. When the breakable portion 14 ruptures as the door portion 13 opens, stress is concentrated in portions of the facing member 17 where the recess 17d is formed. The facing member 17 can be broken easily, enabling the door portion 13 to be opened smoothly.

To easily align the recess 17d of the facing member 17 with the breakable portion 14 of the cover portion 12, a bracket 16 is disposed from outer peripheral edges of the cover portion 12 toward the direction of the air bag device 1. The bracket 16 can be used to easily locate the connection of the air bag device 1 and the instrument panel more precisely.

2nd Embodiment

Figure 6:
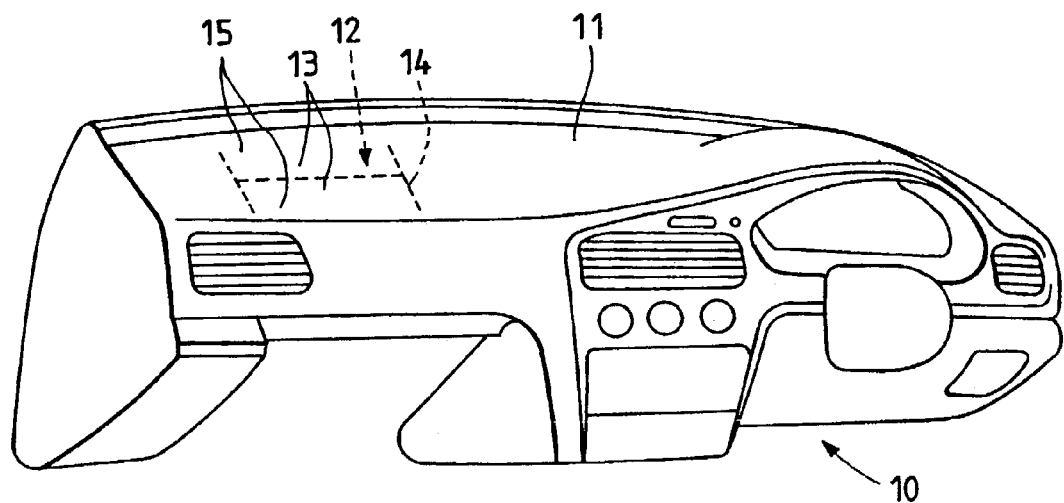
FIG. 6 is a perspective view of the second embodiment.

The instrument panel 10 of the second embodiment shown in FIGS. 5 and 6, is provided without the facing member 17. As with the first embodiment, the main body 11 is made of PPF, and the cover portion 12 is made of TPO in the same manner as that of the first embodiment. Except for the effects provided by the facing member 17, the same effects as those of the first embodiment can be realized: the material of the cover portion 12 is capable of thermally fusing with the material of the main body 11, and the breakable portion 14 is defined by the recessed periphery of the cover portion 12.

Although no facing member 17 is provided on the instrument panel 10 of the second embodiment, the main body 11 and the cover portion 12 form one continuous surface. Accordingly, no gaps or splits are formed on the surface where the main body 11 and the cover portion 12 are joined. Therefore, a first embodiment-like quality of external appearance can be maintained.

Figure 7A:
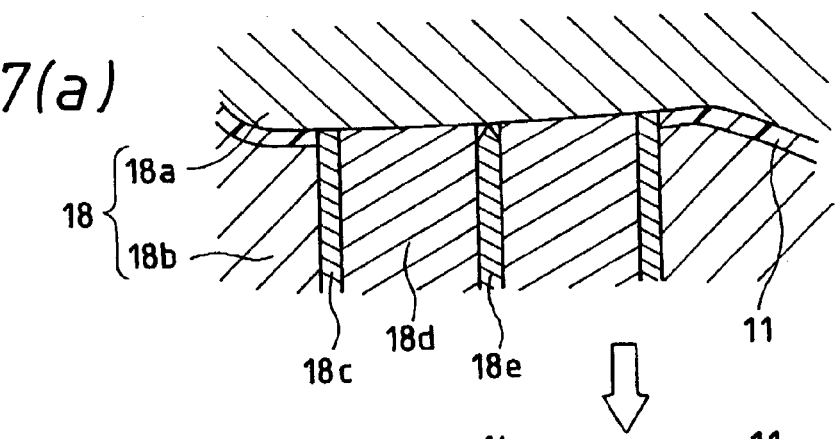
FIGS. 7(a) and 7(b) are cross-sectional views showing a forming process of the second embodiment.
Figure 7B:
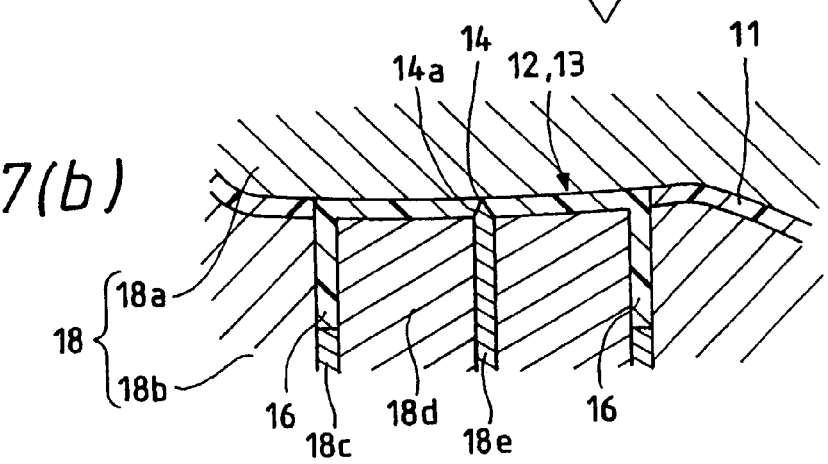

Further distinguishing from the first embodiment, the breakable portion 14 of the second embodiment forms an H-shape. The door portion 13 which opens in the expansion of the air bag 2 is composed of two door members. The instrument panel may be arranged as described above. In this connection, a hinge portion 15 is provided for each door member of the door portion 13. As shown in FIGS. 7(a) and 7(b), the mold 18 used for forming the instrument panel 10 has split molds 18a and 18b. The split mold 18b includes: a square tube type sliding core 18c used for forming the cover portion 12; a substantially square pillar type sliding core 18d; and a sliding core 18e which is disposed in the sliding core 18d, wherein the sliding core 18e forms a recess 14a on the back side of the breakable portion 14.

In the process of molding, end portions of the sliding cores 18c, 18d are made to come into contact with the split mold 18a. Then the mold is fastened producing the main body 11 as shown in FIG. 7(a).

Then the sliding core 18c is lowered to its initial position while at the same time the sliding core 18d is lowered just slightly. Further, the sliding core 18e protruding from the sliding core 18d forms the cover portion 12 as shown in FIG. 7(b). After the cover portion 12 has been solidified, the mold is opened and released. Then the attaching holes 16a of the bracket 16 are formed by an ultrasonic welder, resulting in a finished instrument panel 10.

As a means of connecting the bracket 16 with the case 5 of the air bag device 1, a rivet 27 is inserted into attaching holes 5d, 16a. As described above, the bracket 16 and the case 5 may be connected with each other by the rivet 27 or other connecting means such as a bolt and nut. On the instrument panels 10 of the first and the second embodiments, the square tube type bracket 16 is constructed and arranged for connecting the bracket 16 and the air bag device 1. When this bracket 16 is connected with the case 5 which surrounds the periphery of the air bag 2 of the air bag device 1, it is not necessary to form the bracket 16 into a tubular shape. Rather, a plate-shaped bracket may be used so that it can be connected with the case 5.

3rd Embodiment

If the air bag device 1 can be accurately disposed on the back side of the cover portion 12, it is not necessary to use the bracket 16. Therefore, the instrument panel 10 may be arranged according to the third, fourth and fifth embodiments illustrated in FIGS. 8 to 10.

Figure 8:
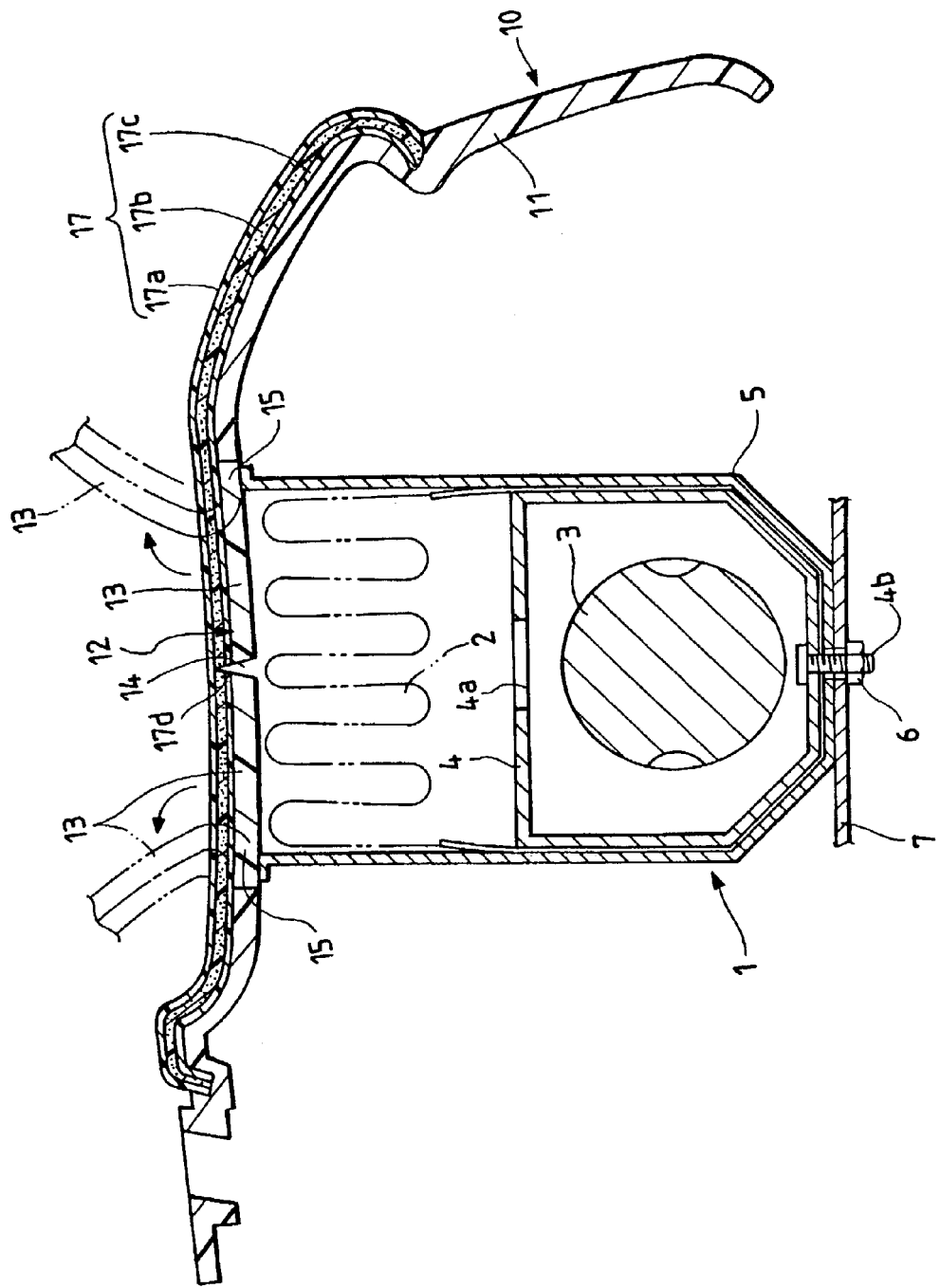
FIG. 8 is a cross-sectional view showing a third embodiment of the present invention.

According to the third embodiment shown in FIG. 8, the main body 11 of the instrument panel 10 is made of PPF. The cover portion 12, made of SEBS, comprises two door portions 13, a breakable portion 14 which is arranged in an H-shape and two hinge portions 15. On the surfaces of the main body 11 and the cover portion 12, there is provided a facing layer 17. The instrument panel 10 of the third embodiment can provide the same effects as those of the instrument panel 10 of the first embodiment except that no bracket 16 is provided in the third embodiment.

4th Embodiment

Figure 9:
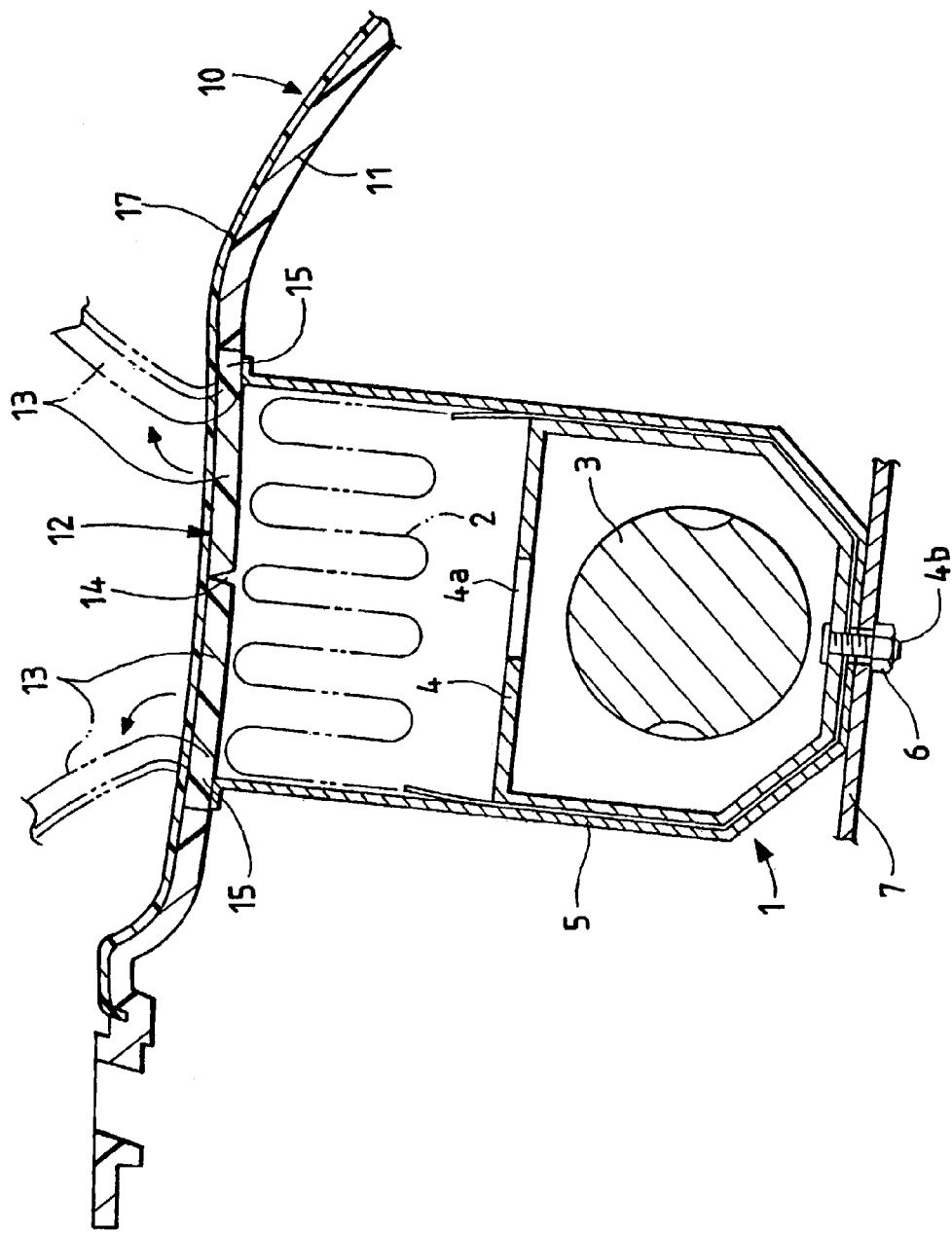
FIG. 9 is a cross-sectional view showing a fourth embodiment of the present invention.

According to the fourth embodiment shown in FIG. 9, the main body 11 is made of PPF. The cover portion 12, made of TPO, comprises two door portions 13, a breakable portion 14 which is arranged in an H-shape and two hinge portions 15. A facing member 17 made of soft vinyl chloride is disposed over the main body 11 and the cover portion 12. The instrument panel 10 of this fourth embodiment can provide the same effects as those of the instrument panel 10 of the first embodiment except for the following.

In the fourth embodiment, there is no bracket 16 and no foaming layer on the facing member 17. Accordingly, the facing member 17 of the instrument panel 10 of the fourth embodiment does not feel as soft as that of the first embodiment.

5th Embodiment

According to the fifth embodiment shown in FIG. 10, the main body 11 is made of PPF. The cover portion 12 made of TPO comprises two door portions 13, the breakable portion 14 which is arranged in an H-shape and the hinge portions 15. This instrument panel 10 of the fifth embodiment can provide the same effects as that of the instrument panel 10 of the second embodiment except that there is provided no brackets 16 in the fifth embodiment.

6th Embodiment

Figure 12A:
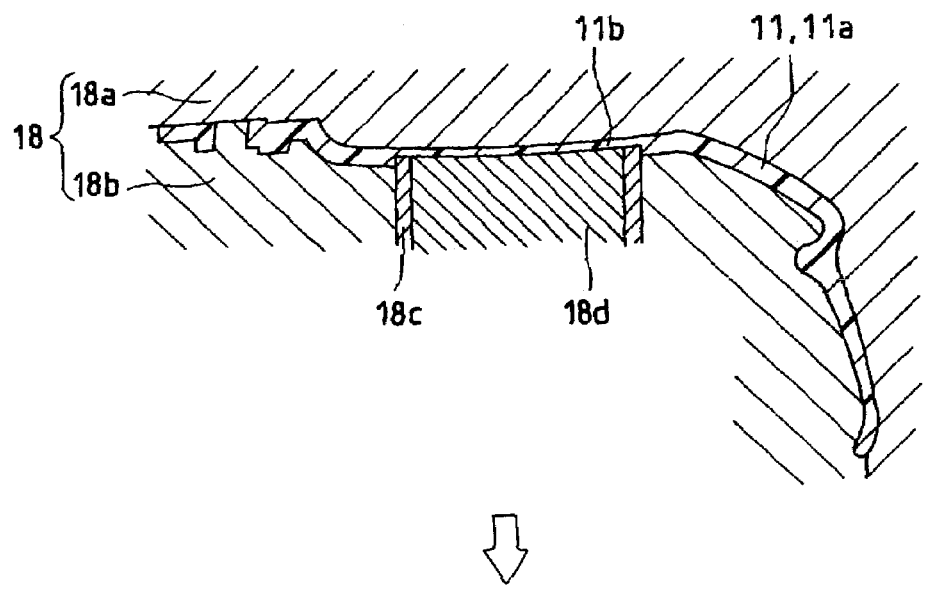
FIGS. 12(a) and 12(b) are cross-sectional views showing a forming process of the device of the sixth embodiment.
Figure 12B:
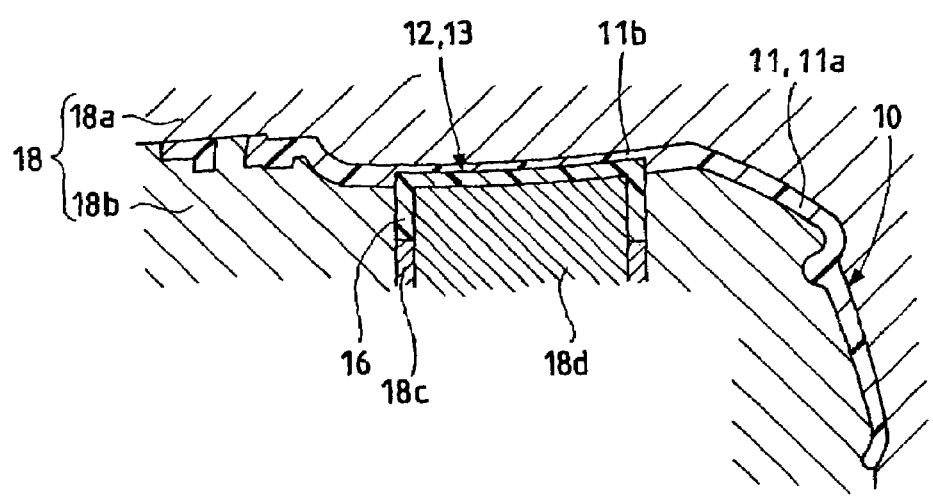

The instrument panel 10 of the sixth embodiment is different from the first to fifth embodiments in that the main body 11 comprises a coating portion 11b and a general portion 11a as shown in FIGS. 11(a), 11(b), 12(a) and 12(b). Therefore, the coating portion 11b forms a first layer of the cover portion 12, and the upper part of the bracket 16 forms a second layer of the cover portion 12, as shown in FIG. 11(a) or FIG. 12(b). The upper part of the bracket 16, or the second layer, is located on the back side of the coating portion 11b, or first layer, as shown. Note that the outer surface of the main body 11 is continuous with the outer surface of the coating portion 11b, since these surfaces are formed by the same surface of the split mold 18a, as shown in FIG. 12(a).

In order to ensure the required rigidity, the average thickness of the general portion 11a is preferably not less than 3.0 mm. In order to ensure the deployment property, the thickness of the coating portion 11b is preferably between 0.1 to 0.5 mm. In this sixth embodiment, the thickness of the coating portion 11b is preferably 0.2 mm. These specifications are necessary because when the thickness of the coating portion 11b is smaller than 0.1 mm, it is difficult to coat an entire surface of the cover portion 12 in a good condition. When the thickness of the coating portion 11b exceeds 0.5 mm, the deployment property is deteriorated.

The manufacturing method of the instrument panel 10 of the sixth embodiment is different from that of the first to fifth embodiments with respect to the following points. As shown in FIG. 12(a), there is a gap capable of forming the coating portion 11b positioned between the split mold 18a and the sliding cores 18c, 18d. Thus, the same material that forms the main body fills the gap during the molding process as shown in FIG. 12(a). The other steps except for this point are the same as those of the first to fifth embodiments.

When the recess 14a of the breakable portion 14 is formed, the recess may be continuously or intermittently formed on the back side of the coating portion 11b, as schematically shown in FIG. 11(b).

On the surface of the cover portion 12 of the instrument panel 10 of the sixth embodiment, a coating portion 11b extends from the general portion 11a of the main body 11 and continues over the cover portion 12. Therefore, an external surface of the instrument panel 10 can have a unified appearance.

7th Embodiment

The instrument panel 10 of the seventh embodiment is shown in FIG. 13. A rivet 27 may be used for connecting the bracket 16 with the case 5, wherein the rivet 27 is inserted into the attaching hole 5d of the case 5 and the attaching hole 16a of the bracket 16. Further, other connecting means such as a bolt and nut may be used.

8th Embodiment

Figure 14:
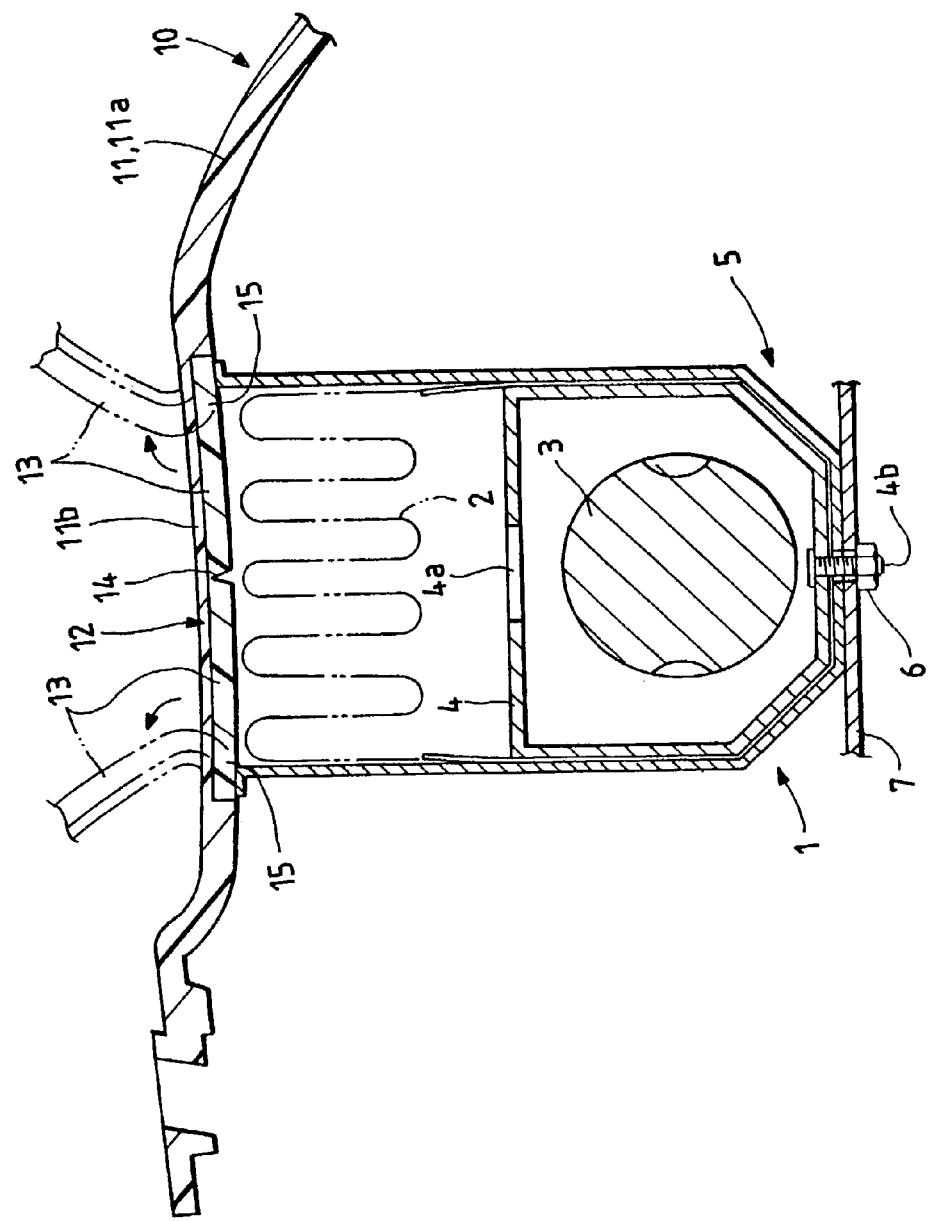
FIG. 14 is a cross-sectional view showing an eighth embodiment of the present invention.
Figure 15:
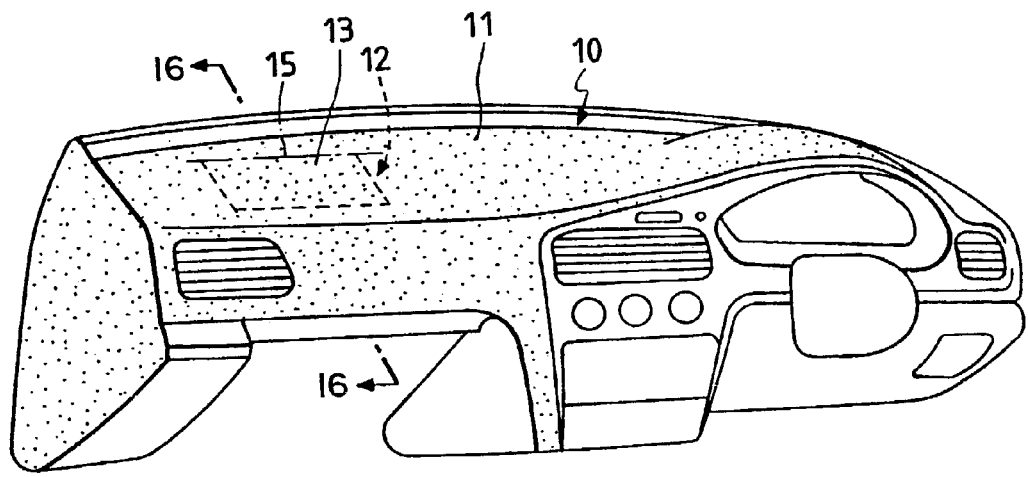
FIG. 15 is a perspective view showing a condition in which the instrument panel of a ninth embodiment is mounted on an automobile.
Figure 18:
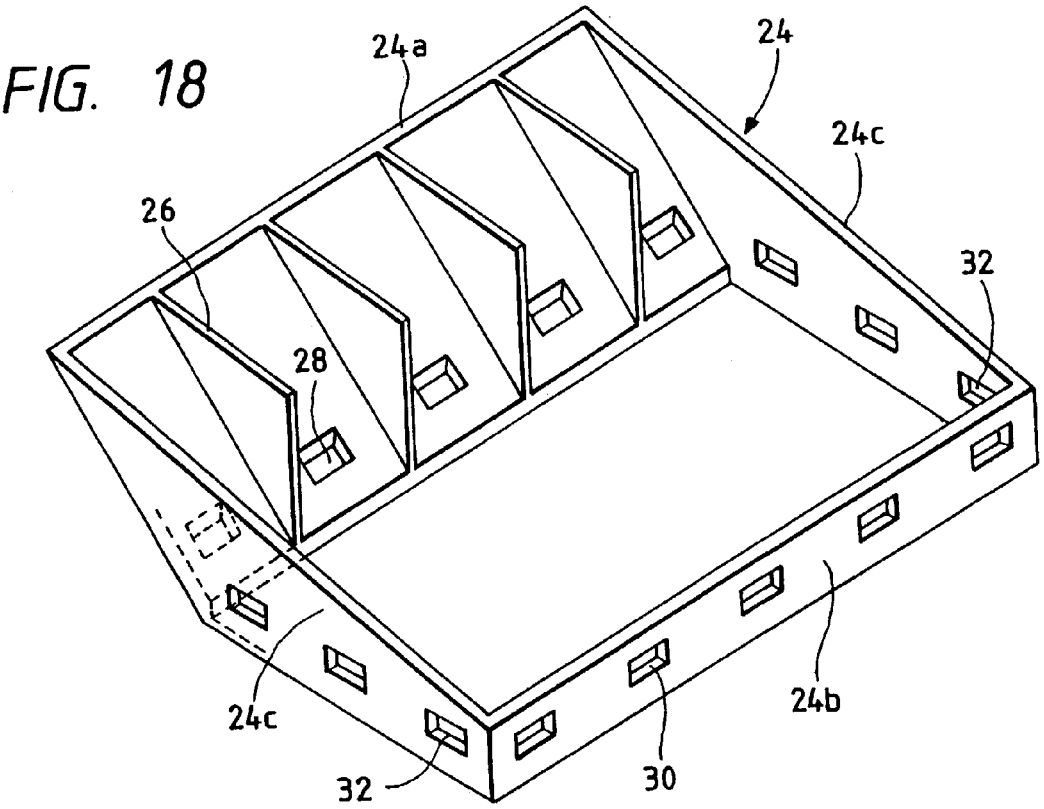
FIG. 18 is a perspective view of the lower surface of the attaching wall of the cover portion on the instrument panel of the ninth embodiment.

The instrument panel of the eighth embodiment is shown in FIG. 14. There is no bracket 16 in this instrument panel. However, the instrument panel can provide the same effects as those of the instrument panels 10 of the sixth and seventh embodiments.

In the sixth to the eighth embodiments, the thickness of the breakable portion 14 is thinner than its surrounding portions of the instrument panel. However, the breakable portion 14 may be composed in such a manner that the depth of the recess portion 14a is increased so that the recess portion 14a can reach the coating portion 11b. In this case, no layer of thermoplastic elastomer is provided.

On the surface of the coating portion 11b of the main body 11, a recess portion may be provided aligning with the breakable portion 14. Alternatively, as described above, the depth of the recess portion 14a may be increased.

9th Embodiment

Similar to the aforementioned embodiments, the instrument panel 10 of the ninth embodiment shown in FIGS. 15 to 18 includes a main body 11 and a cover portion 12 for an air bag device 1, wherein the main body 11 and the cover portion 12 are formed integrally with each other in such a manner that the main body 11 and the cover portion 12 form a continuous surface. A door portion 13 is defined by a breakable portion 14 and a hinge portion 15. From the back side of the cover portion 12, a square tubular attaching wall 24 projects toward and connects to the air bag device 1. The fundamental transverse section of the instrument panel 10 is curved, and the mold releasing direction of the instrument panel 10 crosses a direction of deployment of the air bag. In this case, the main body 11 and he cover portion 12 maybe made of the same material. However, in this embodiment, the two-differential-property forming method is adopted as the aforementioned embodiments, by which the characteristics required for the main body 11 and the cover portion 12 can be respectively provided.

Commonly, the cover portion 12 is made of thermoplastic elastomer whose tensile rupture stress is preferably between 5 to 30 MPa, and more preferably between 8 to 20 MPa.

In order to ensure the rigidity and the low temperature resistance property, the main body 11 is made of rigid thermoplastic resin or plastics containing reinforcing filler whose bending elastic modulus is preferably not less than 2000 MPa, more preferably approximately 2500 MPa. Specifically, when the cover portion 12 is made of olefin thermoplastic elastomer or styrene thermoplastic elastomer, olefin resin containing glass fiber may be used in order to ensure the thermally fusing property. More specifically, the aforementioned FRTP may be used.

The instrument panel 10 of the ninth embodiment has an attaching wall 24 which comprises a rear attaching wall 24a and a front attaching wall 24b. The rear attaching wall 24a is an oblique wall provided in a same direction as the mold releasing direction. It is possible to form the front attaching wall 24b to be an oblique wall in the same manner. In other words, it is possible to form the front attaching wall 24b to be parallel with the rear attaching wall 24a. However, when the instrument panel 10 is actually mounted on a car, air conditioning ducts and the like are disposed on the front side of the instrument panel 10. For this reason, the front attaching wall 24b is formed into a substantially perpendicular wall. The right and the left attaching walls 24c are formed perpendicularly.

In some cases, it is considered that the mechanical strength of the rear attaching wall 24a is not sufficiently high. Hence, for the purposes of ensuring the mechanical strength of the rear attaching wall 24a and guiding the expanding air bag, a plurality of triangular reinforcing ribs 26 are disposed between the rear attaching wall 24a and the cover portion 12, in parallel with the mold releasing direction. For the purpose of enhancing the smooth expansion property of the air bag 1, rear end portions of the reinforcing ribs are arranged in parallel with the front attaching wall. In addition, upper front portions of the reinforcing ribs 26 are arranged adjacent to the breakable portion 14 of the cover portion 12. On the air bag attaching walls 24a, 24b, 24c, a plurality of first, second and third engaging holes 28, 30, 32 are respectively provided.

Figure 17:
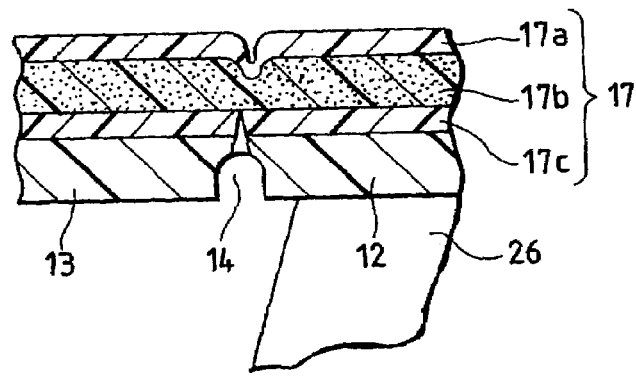
FIG. 17 is an enlarged cross-sectional view of the circled portion in FIG. 16.

As described in the above embodiments, to enhance the design, a facing member 17 is disposed over the cover portion 12 and the main body 11. This facing layer 17 includes: a skin layer 17a, a foaming layer 17b, and a barrier layer 17c as shown in FIG. 17.

Figure 19:
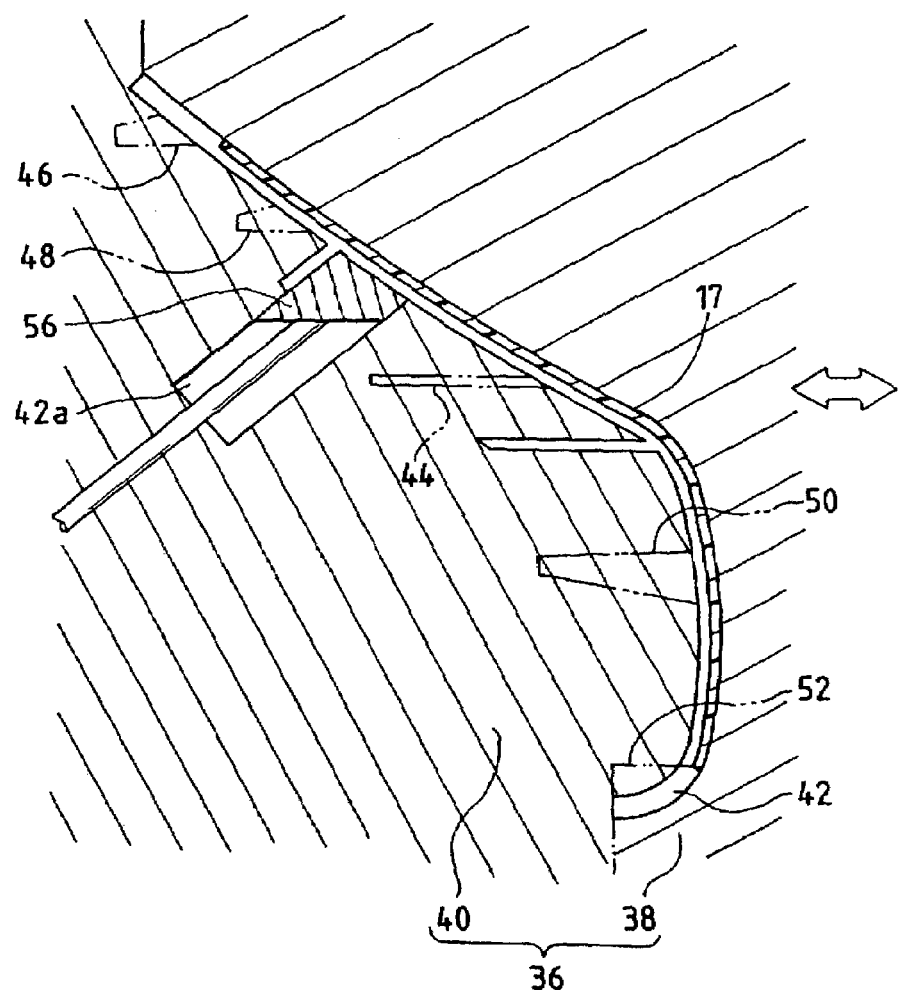
FIG. 19 is a cross-sectional view showing an outline of a condition in which the mold is fastened in the instrument panel manufacturing method of the ninth embodiment.
Figure 20:
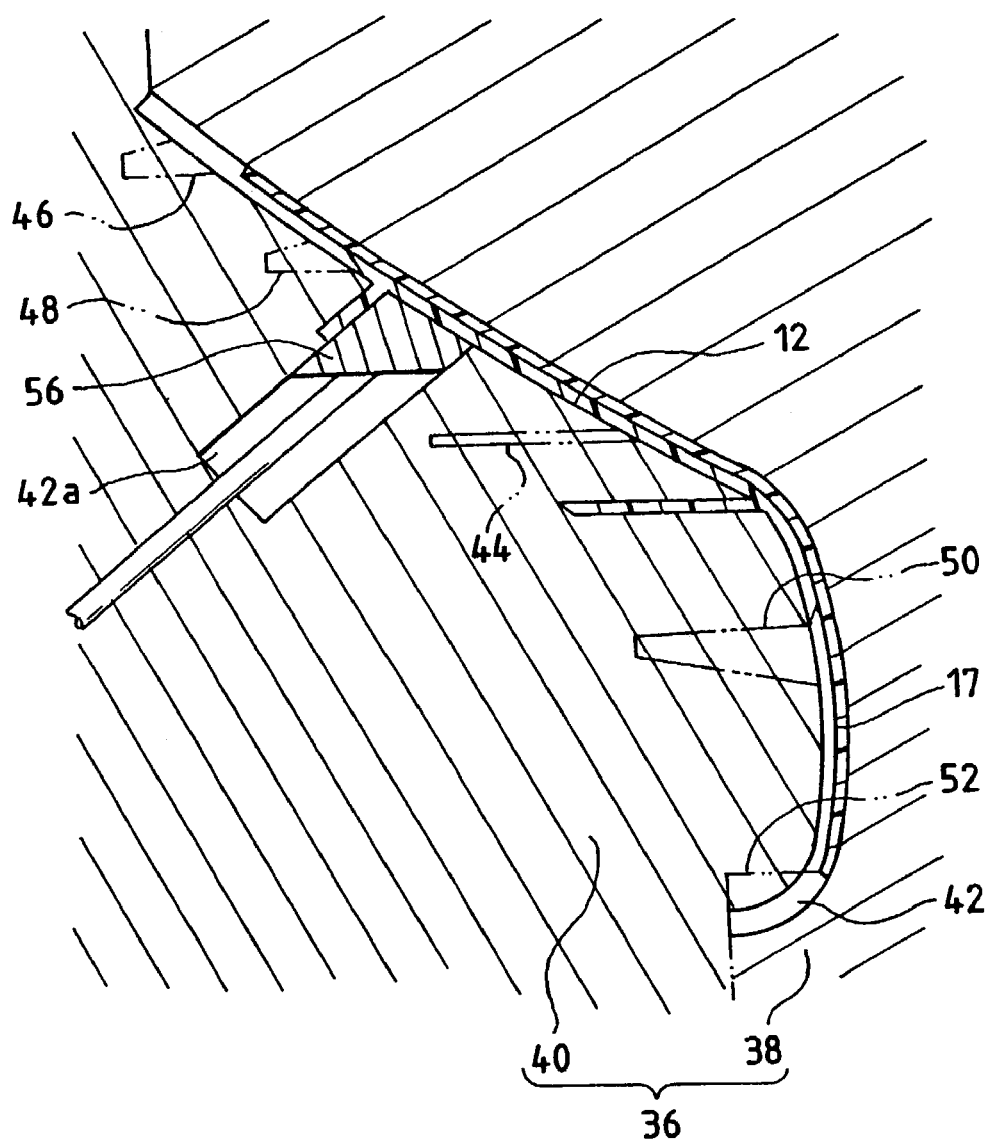
FIG. 20 is a cross-sectional view showing an outline of a condition after the cover portion of the ninth embodiment has been formed.
Figure 21:
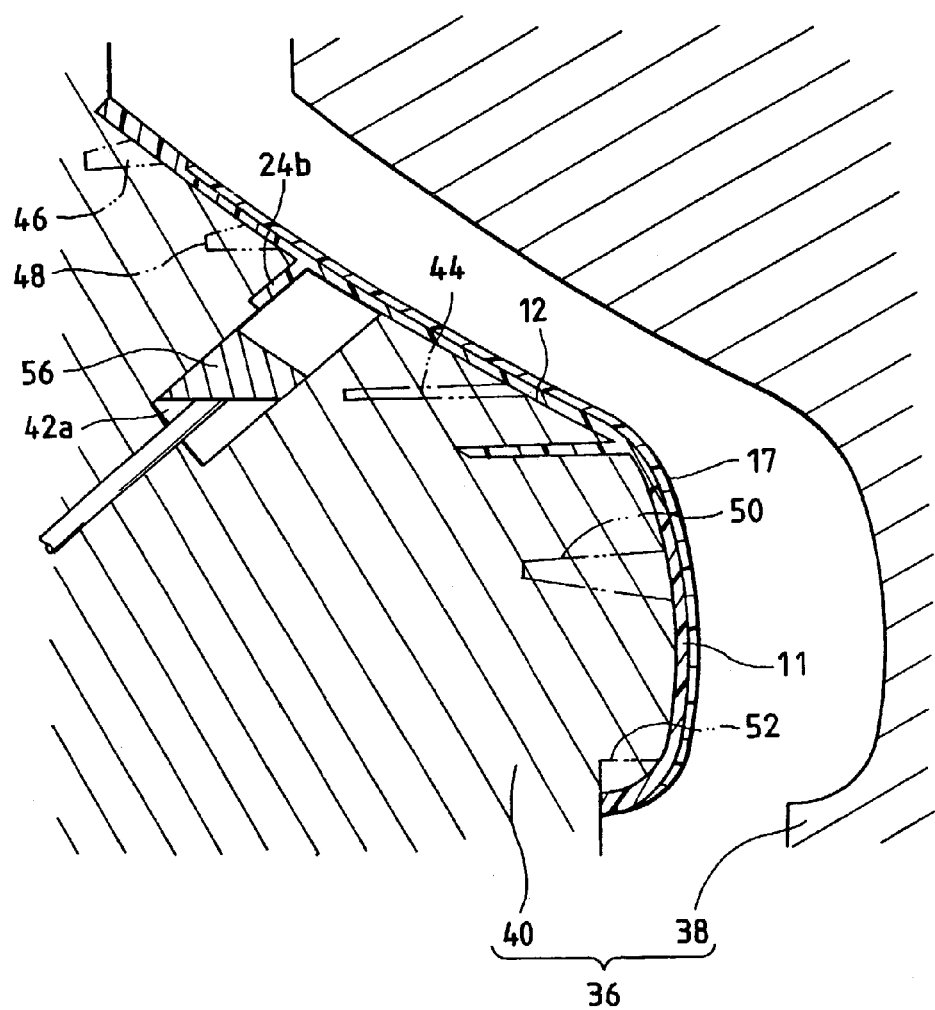
FIG. 21 is a cross-sectional view showing an outline of a condition in which the main body of the ninth embodiment is formed.
Figure 22:
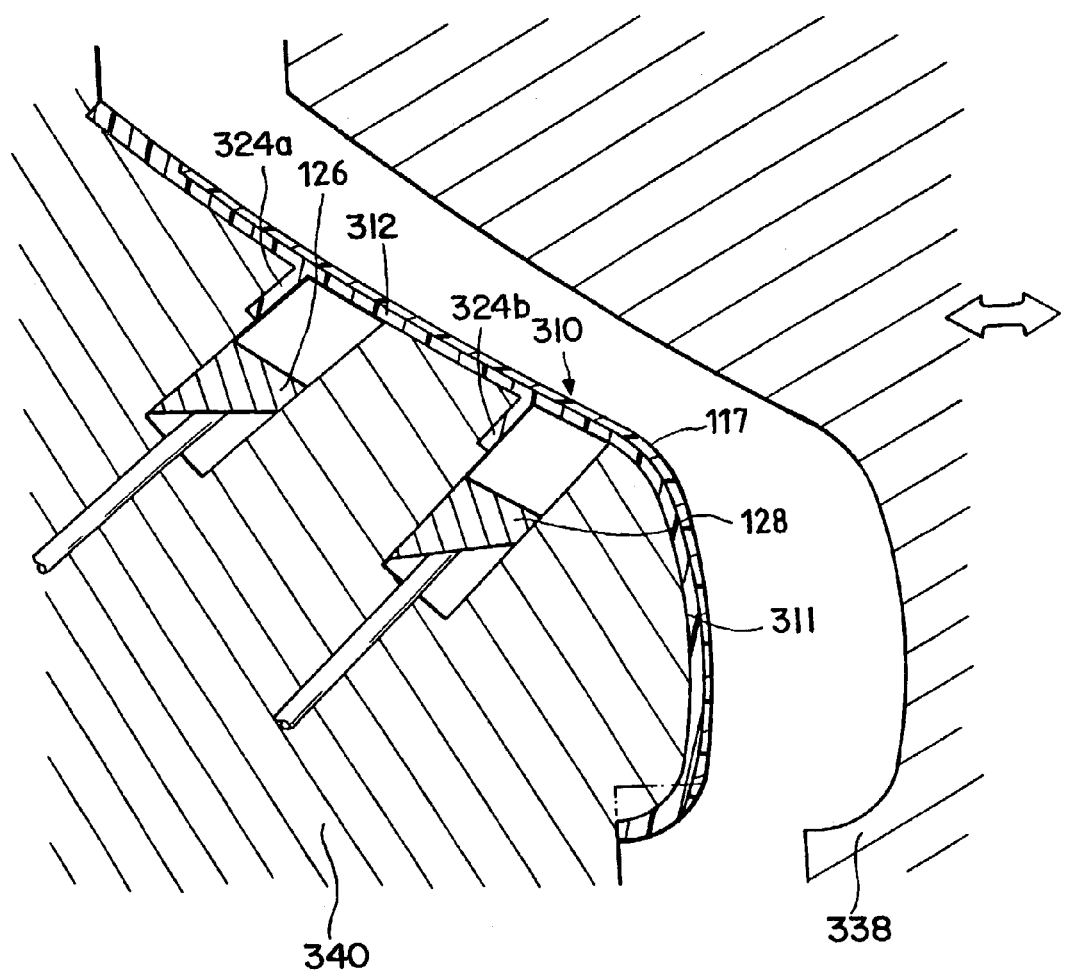
FIG. 22 is a cross-sectional view showing an outline of the metallic mold used for the related art instrument panel manufacturing method.

A method of manufacturing the instrument panel 10 of the ninth embodiment is illustrated in FIGS. 19 to 21.

The facing member 17, which is previously formed into a predetermined shape by means of vacuum forming, is set in a movable mold 38 of a metallic mold 36. Then the metallic mold 36 is fastened as shown in FIG. 19. That is, the movable mold 38 is moved from a stationary mold 40 in the direction of the arrow, so that a cavity 42 can be formed.

The stationary mold 40 comprises a first gate 44 for forming the cover portion, a second gate 46, a third gate 48, a fourth gate 50 and a fifth gate 52 all for forming the main body. Inside the cavity 42a of the stationary mold 40 for forming the front attaching wall, a sliding core 56 is provided by which the metallic mold 36 can be released.

Thermoplastic elastomer is injected through the first gate 44 into the metallic mold 36 and the cavity 42. In this way, the cover portion 12 is formed by injection molding as shown in FIG. 20. In this case, a portion where the cover portion 12 is suppose to join the main body 11, which is an outer peripheral edge of the cover portion 12, is set in a free condition. The quantity of elastomer injected is regulated by preferably setting the injection pressure to middle range (22 to 30 MPa) and the value of MFR (melt flow rate) of the thermoplastic elastomer to relatively high range (5 to 15 g/10 minutes). When the quantity of injection is regulated, a flow of material is stopped at a position where the cover portion 12 is suppose to join the main body 11.

For example, to form a cover of 3.5 mm in thickness from TPO, the specifications for the injection condition are as follows: injecting pressure is 25 MPa; injecting temperature is 200° C.; and metallic mold temperature is 30° C. The specification of TPO is as follows: tensile rupture strength is 10 MPa and hardness is 45 (JIS D).

Before the cover portion 12, which has been molded by injection, is solidified, thermoplastic resin, which is capable of thermally fusing with thermoplastic elastomer, is injected into the cavity 42 via the second, third, fourth and fifth gates 46, 48, 50, 52. The result is a main body 11 molded by injection.

Depending upon the type of the first thermoplastic elastomer and the temperature of the metallic mold before the solidification of the cover portion 12, the main body 11 is usually molded by injection 30 to 150 seconds after completing the injection of the cover portion 12, or preferably 60 to 100 seconds after completing the injection of the cover portion 12. In this case, thermoplastic resin is preferably injected at a middle pressure (22 to 30 MPa) from the third and the fourth gates 48, 50 where the facing layer 17 is provided, and thermoplastic resin is preferably injected at a high pressure (30 to 40 MPa) from the second and the fifth gates 46, 52. Thermoplastic resin is injected at a middle pressure from the third and the fourth gates 48, 50 because the facing layer 17 is deformed when injection is conducted at a high pressure.

For example, when injection is conducted using the FRTP, the injecting conditions would be as follows: injection pressure is 35 MPa (high pressure) from the second and fifth gates 46, 52; injection pressure is 25 MPa (middle pressure) from the third and fourth gates; injection temperature is 200° C.; and metallic mold temperature is 30° C. The specification of FRTP is as follows: tensile rupture strength is 28 MPa; hardness is 90 (Rockwell Hardness R); and the bending elastic modulus is 2750 MPa.

After the solidification of the main body 11, the metallic mold is released. At this time, the sliding core 56 is withdrawn to a position where the sliding core 56 does not interfere with the front attaching wall 24b.

After the product has been released from the metallic mold, the gate portion is removed. In order to ensure the breaking property of the breakable portion 14, it is preferable that the breakable portion 14 is notched onto the barrier layer 17c of the facing layer 17 as shown in FIG. 17. The breakable portion 14 is notched onto the barrier layer 17c because the mechanical strength of the barrier layer 17c is relatively high. Specifically, the breakable portion 14 is composed of perforations, whose length in the continuous portion is 3 mm, and whose length in the noncontinuous portion is 9 mm.

In the embodiment shown in FIG. 17, the thickness of the breakable portion 14 on the skin layer 17a is also reduced, although this is not necessary.

By means of press forming, a plurality of the first, second, and third engaging holes, 28, 30, 32 are formed on the attaching walls 24a, 24b, 24c.

The resulting manufactured instrument panel 10 is attached in the following manner so that the cover portion 12 can be disposed at an upper position of the air bag device 1.

An air bag module of the air bag device 1, including an air bag 2, inflator 3 and diffuser 4, is fixed to the bag case 60, whose upper surface is open, by screws via a flange portion 4c of the diffuser 4.

Via the case 60, the air bag device 1 is attached to a reinforcing bracket 70 which is fixed to the reinforcing pipe 68 connected to a vehicle body side.

In this connection, a rear supporting wall 60a, of an upper receiving portion of the bag case 60 extends obliquely to the rear. The rear supporting wall 60a corresponds to the rear attaching wall 24a. On the supporting walls 60a, 60b, 60c, there are first, second and third engaging claws 72, 74, 76 so that the attaching walls 24a, 24b, 24c can be respectively supported. Further, on the rear attaching wall 24a and the front attaching wall 24b, a first receiving piece 78 and second receiving piece 80 are provided. In this way, a double structure is partially made.

As described above, when the attaching walls 24 of the instrument panel 10 are set along and are engaged with the inside of the support walls 60a, 60b, 60c of the bag case 60; the first, second, and third engaging claws 72, 74, 76 are respectively engaged with the first, second, and the third engaging holes 28, 30, 32, so that a portion close to the cover portion 12 of the instrument panel 10 can be held by the vehicle body. The other portion of the instrument panel 10 is fixed to and held by an attaching bracket provided on the vehicle body side.

In all of the present embodiments, explanations are made with respect to an instrument panel. However, it should be noted that the present invention is not limited to an instrument panel, but it is possible to apply the present invention to other interior finish members such as a door trim and a seat back.

What is claimed is:

1. An interior finish member having a door suitable for use with an air bag device, the finish member comprising:
   a main body having a surface and being made of a rigid synthetic resin material; and
   a cover portion, which is constructed and arranged to provide the door for deployment of an air bag, wherein the cover portion has a first layer made of a material that is the same as that of the main body and that is formed integrally with the main body, and the cover portion has a second layer made of thermoplastic elastomer, and wherein the second layer is formed on a back side of the first layer.

2. The interior finish member according to claim 1, wherein the interior finish member is an instrument panel.

3. The interior finish member according to claim 1, wherein the second layer comprises a door portion, a breakable portion and a hinge portion.

4. The interior finish member according to claim 3, wherein a bracket for mounting the air bag device is formed at a periphery of the door portion.

5. The interior finish member according to claim 1, wherein the first layer and the second layer are thermally fused.

6. The interior finish member according to claim 1, wherein a surface of the main body and a surface of the first layer are continuous with one another.

7. The interior finish member according to claim 1, wherein a bending elastic modulus of a material used for the main body is not less than 2000 MPa, and the thickness of the main body adjacent to the cover portion is 3.5 mm.

* * * * *